United States Patent
Gong et al.

(10) Patent No.: US 11,539,489 B2
(45) Date of Patent: Dec. 27, 2022

(54) CONTROL INFORMATION TRANSMISSION METHOD, RECEIVING METHOD, DEVICE, BASE STATION AND TERMINAL

(71) Applicant: ZTE CORPORATION, Guangdong (CN)

(72) Inventors: Yuhong Gong, Guangdong (CN); Zhaohua Lu, Guangdong (CN); Feng Bi, Guangdong (CN); Shujuan Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 747 days.

(21) Appl. No.: 16/483,476

(22) PCT Filed: Dec. 15, 2017

(86) PCT No.: PCT/CN2017/116544
§ 371 (c)(1),
(2) Date: Oct. 27, 2019

(87) PCT Pub. No.: WO2018/141180
PCT Pub. Date: Aug. 9, 2018

(65) Prior Publication Data
US 2022/0216967 A1    Jul. 7, 2022

(30) Foreign Application Priority Data

Feb. 4, 2017    (CN) .......................... 201710064571.5

(51) Int. Cl.
*H04L 5/00*    (2006.01)
*H04L 27/26*    (2006.01)
*H04W 72/04*    (2009.01)

(52) U.S. Cl.
CPC ............ *H04L 5/0053* (2013.01); *H04L 5/001* (2013.01); *H04L 27/2607* (2013.01);
(Continued)

(58) Field of Classification Search
CPC . H04L 5/0053; H04L 27/26025; H04L 5/001; H04L 27/2607; H04W 72/046; H04W 72/044
See application file for complete search history.

(56) References Cited

U.S. PATENT DOCUMENTS 8,953,720 B1 *  2/2015  Palanivelu .......... H04L 27/2666
                                                    375/340
2007/0253370 A1 * 11/2007 Khan ................... H04L 5/0007
                                                    370/331
(Continued)

FOREIGN PATENT DOCUMENTS

CN        101060699 A    10/2007
CN        101132204 A     2/2008
(Continued)

OTHER PUBLICATIONS

WIPO, International Search Report dated Feb. 12, 2018.

*Primary Examiner* — Maharishi V Khirodhar
*Assistant Examiner* — Kenneth P Hunt
(74) *Attorney, Agent, or Firm* — Li & Cai Intellectual Property (USA) Office

(57) ABSTRACT

A control information transmission method, a receiving method, a device, a base station, a terminal, and a storage medium. The control information transmission method includes: transmitting control information according to a specified transmission mode, wherein there is a predetermined relationship between the specified transmission mode and a data channel.

20 Claims, 5 Drawing Sheets

Transmit control information according to a specified transmission mode, wherein the specified transmission mode has a predetermined relationship with a data channel — S202

(52) U.S. Cl.
CPC ..... *H04L 27/26025* (2021.01); *H04W 72/044* (2013.01); *H04W 72/0406* (2013.01)

(56) References Cited

U.S. PATENT DOCUMENTS

| | | | |
|---|---|---|---|
| 2012/0324315 A1* | 12/2012 | Zhang | H04L 1/0043 714/776 |
| 2014/0301301 A1* | 10/2014 | Cheng | H04L 5/0048 370/329 |
| 2017/0111152 A1* | 4/2017 | Blankenship | H04W 72/042 |
| 2017/0201989 A1* | 7/2017 | Fakoorian | H04W 72/0446 |
| 2018/0062700 A1* | 3/2018 | Al Rawi | H04L 25/03006 |
| 2018/0063835 A1* | 3/2018 | Abedini | H04W 72/042 |

FOREIGN PATENT DOCUMENTS

| | | |
|---|---|---|
| CN | 103188051 A | 7/2013 |
| CN | 104796986 A | 7/2015 |

* cited by examiner

CONTROL INFORMATION TRANSMISSION METHOD, RECEIVING METHOD, DEVICE, BASE STATION AND TERMINAL

CROSS-REFERENCE TO RELATED APPLICATIONS

The present disclosure is based on and claims priority of Chinese Patent Application No. 201710064571.5, filed on Feb. 4, 2017, the disclosure of which is incorporated herein by reference.

FIELD OF THE INVENTION

The present disclosure relates to the field of communications, and in particular, to a method for transmitting control information, a receiving method, a device, a base station, a terminal, and a storage medium.

BACKGROUND

With the development of wireless communication technologies and the increasing demands of users for communication, in order to satisfy with higher, faster and newer communication needs, the fifth generation mobile communication (5th Generation, 5G for short) technology has become a development trend of the future network.

In a traditional Long Term Evolution (LTE) system, a communication channel mainly includes a control channel and a data channel, wherein the data channel is mainly used for transmitting data services, and the control channel is mainly used for transmitting indication signaling of the base station, including an indication about indication information of data transmission. In the LTE system, the multiplexing mode of the control channel and the data channel is either Time Division Multiplex (TDM) or Frequency Division Multiplex (FDM). For example, the traditional Physical Downlink Control Channel (PDCCH) and the data channel are mainly multiplexed in a TDM manner, that is, Orthogonal Frequency Division Multiplexing (OFDM) symbols for control channel transmission cannot be used for transmitting the data channel, and symbols for data channel transmission cannot be used for transmitting the control channel. The enhanced Physical Downlink Control Channel (ePDCCH) and the data channel are mainly multiplexed in the FDM mode, that is, the Physical Resource Block (PRB) for control channel transmission cannot be used for transmitting the data channel, and the PRB for data channel transmission cannot be used for transmitting the control channel. This is not a very effective way to utilize resources. Especially, for the 5G communication systems oriented to large bandwidth, when there are idle resources on the symbols of the control channel, the transmission efficiency of the data channel can be significantly improved if the PRB of the control channel can be used for the data channel transmission. On the other hand, if the idle PRB of the data channel can be used to transmit the control channel, the transmission capacity of the control channel can also be enhanced. Therefore, in the 5G communication system, it has become a trend to multiplex the control channel and the data channel in a more flexible manner. For example, the system can dynamically support TDM, or FDM or both TDM and FDM in a multiplex manner according to requirements of environment, and the control channel and the data channel may possibly adopt different parameter configurations (numerology). However, this may increase the communication channel design and the complexity of user reception, and the increase in signaling overhead is also an unavoidable problem. How to comprehensively consider the complexity and signaling overhead to realize flexible and effective transmission multiplexing mode of the control channels and data channels is a problem to be solved.

In view of the above problems, there is no effective solution in the related art.

SUMMARY

Embodiments of the present disclosure provide a control information transmission method, a receiving method, a device, a base station, a terminal, and storage medium, so as to at least solve the problems of the high complexity of the communication channel design and the user reception and the heavy signaling overhead in the related art.

According to an embodiment of the disclosure, there is provided a method for transmitting control information, including: transmitting control information according to a specified transmission mode, wherein the specified transmission mode has a predetermined relationship with a data channel.

In an embodiment, the specified transmission mode includes: carrying the control information in the control channel for transmission.

In an embodiment, the method further includes assigning a plurality of parameter configurations for the control channel.

In an embodiment, the predetermined relationship between the specified transmission mode and the data channel includes: a correspondence relationship between a parameter configuration of the control channel and a parameter configuration of the data channel.

In an embodiment, the parameter configuration of the control channel includes at least one of: a Cyclic Prefix length of the Orthogonal Frequency Division Multiplexing OFDM symbol; a length of the Orthogonal Frequency Division Multiplexing OFDM symbol; the number of Orthogonal Frequency Division Multiplexing OFDM symbol; a frequency domain Subcarrier Spacing; the number of frequency domain subcarrier; and a proportion of the Cyclic Prefix in the Orthogonal Frequency Division Multiplexing OFDM symbol.

In an embodiment, the parameter configuration of the data channel includes at least one of: a Cyclic Prefix length of Orthogonal Frequency Division Multiplexing OFDM symbol; a length of Orthogonal Frequency Division Multiplexing OFDM symbol; the number of Orthogonal Frequency Division Multiplexing OFDM symbol; frequency domain Subcarrier Spacing; the number of frequency domain subcarrier; and a proportion of the Cyclic Prefix in Orthogonal Frequency Division Multiplexing OFDM symbol.

In an embodiment, the correspondence relationship includes: the Cyclic Prefix length of Orthogonal Frequency Division Multiplexing OFDM symbol and the number or length of the OFDM symbol of the control channel having a predefined correspondence relationship with the Cyclic Prefix length of the OFDM symbol of the data channel.

In an embodiment, the predefined correspondence relationship includes at least one of: the Cyclic Prefix length of the OFDM symbol of the control channel is equal to one Qth of the Cyclic Prefix length of the OFDM symbol of the data channel; the Cyclic Prefix length of the OFDM symbol of the control channel is equal to P times the Cyclic Prefix length of the OFDM symbol of the data channel; the length of OFDM symbol of the control channel is equal one Qth of the length of the OFDM symbol of the data channel; the length of the OFDM symbol of the control channel is equal to P times the length of the OFDM symbol of the data channel; the Cyclic Prefix length of the OFDM symbol of the control channel has a predefined correspondence relationship with the number of OFDM symbol of the control channel; and the length of the OFDM symbol of the control channel has a predefined correspondence relationship with the number of the OFDM symbols of the control channel, wherein Q is a positive integer and a value of Q is equal to a ratio of a frequency domain Subcarrier Spacing of the control channel to a frequency domain subcarrier of the data channel, and P is greater than one Qth and less than or equal to one.

In an embodiment, the method further includes: assigning the parameter configurations for the control channel by at least one of: assigning the parameter configurations for the control channel according to a ratio relationship between a frequency domain Subcarrier Spacing of the control channel and a frequency domain Subcarrier Spacing of the data channel; and assigning the parameter configurations for the control channel according to a frequency domain resource location of the control channel.

In an embodiment, the specified transmission mode includes: transmitting the control information in a control channel region.

In an embodiment, the method further includes: assigning a referenced physical resource block for a physical resource block of the control channel region.

In an embodiment, the predetermined relationship between the specified transmission mode and the data channel includes: the referenced physical resource block being located in the data channel region where the data channel is located.

In an embodiment, the referenced physical resource block is one or more of physical resource blocks of the data channel region at a frequency domain location corresponding to a physical resource block of the control channel region.

In an embodiment, the data channel corresponding to the referenced physical resource block is allowed to be transmitted on a physical resource block of the control channel region.

In an embodiment, the method further includes: determining the referenced physical resource block by at least one of: a predefined manner; a control channel notification; a Medium Access Control MAC signaling notification; and a Radio Resource Control (RRC) signaling notification.

In an embodiment, the specified transmission mode includes: carrying the control information in the data channel for transmission.

In an embodiment, the control information is carried on specified one or more of Transmission Blocks of the data channel for transmission; or the control information is carried on specified one or more of transmission layers of the data channel for transmission.

In an embodiment, the method further includes: assigning a limited Modulation and coding scheme MCS value range for the data channel.

In an embodiment, a referenced data channel is assigned for the data channel carrying the control information, wherein the referenced data channel carries data information, and the data channel carrying the control information and the referenced data channel share a set of transmission parameters.

In an embodiment, the transmission parameter includes at least one of: a time-frequency resource occupied by the data channel transmission; a transmission scheme adopted by the data channel transmission; a Modulation and coding scheme MCS adopted by the data channel transmission; a beam adopted by the data channel transmission; and a demodulation reference signal resource associated with the data channel.

In an embodiment, the demodulation reference signal resource includes two sets of demodulation reference signal resources, wherein the two sets of demodulation reference signal resources are configured to transmit the data channel carrying control information and the referenced data channel, respectively.

In an embodiment, the information carried in the data channel further includes data information.

In an embodiment, the method further includes: assigning the demodulation reference signal after the time domain and/or the frequency domain location of the control information carried in the data channel, and assigning the data information after a start position of a time domain and/or frequency domain location of the demodulation reference signal.

In an embodiment, the method further includes: assigning a basic demodulation reference signal resource and an extended demodulation reference signal resource for the data channel, wherein the basic demodulation reference signal resource is located at the start position of the time domain and/or frequency domain of the control information transmission in the data channel, and the extended demodulation reference signal resource is located at the start position of the time domain and/or frequency domain of the data information transmission in the data channel.

In an embodiment, further includes at least one of: assigning two sets of encoding rates for the data channel, wherein the two sets of encoding rates are configured to transmit the control information and data information, respectively; and assigning two sets of power parameters for the data channel, wherein the two sets of power parameters are configured to transmit the control information and data information, respectively.

In an embodiment, the data channel is located in a scheduling time unit for control information transmission, wherein the scheduling time unit includes one or more time units, and each time unit includes one of: a time slot, minislot, an Orthogonal Frequency Division Multiplexing OFDM symbol, a sub-frame and a frame.

According to another embodiment of the disclosure, there is provided a method for receiving control information, including receiving control information according to a specified transmission mode, wherein the specified transmission mode has a predetermined relationship with a data channel.

In an embodiment, the specified transmission mode includes: receiving the control information by receiving a control channel.

In an embodiment, the method further includes: determining a plurality of parameter configurations of the control channel.

In an embodiment, the predetermined relationship between the specified transmission mode and the data channel includes: a correspondence relationship between a parameter configuration of the control channel and a parameter configuration of the data channel.

In an embodiment, each of the parameter configuration of the control channel and the parameter configuration of the data channel includes at least one of: a Cyclic Prefix length of Orthogonal Frequency Division Multiplexing OFDM symbol; a length of Orthogonal Frequency Division Multiplexing OFDM symbol; the number of Orthogonal Frequency Division Multiplexing OFDM symbol; frequency domain Subcarrier Spacing; the number of frequency domain subcarrier; and a proportion of Cyclic Prefix in Orthogonal Frequency Division Multiplexing OFDM symbol.

In an embodiment, the method further includes: determining, according to a relationship between a Cyclic Prefix of OFDM symbol of the data channel and a Cyclic Prefix of OFDM symbol of the control channel, the number or length of OFDM symbol of the control channel; or determining, according to a relationship between a length of OFDM symbol of the data channel and a length of OFDM symbol of the control channel, the number or length of OFDM symbol of the control channel, wherein the Cyclic Prefix of the OFDM symbol and the number or length of the OFDM symbol of the control channel have a predefined correspondence relationship with the Cyclic Prefix of the OFDM symbol of the data channel.

In an embodiment, the predefined correspondence relationship includes at least one of: the Cyclic Prefix length of the OFDM symbol of the control channel is equal to one Qth of the Cyclic Prefix length of the OFDM symbol of the data channel; the Cyclic Prefix length of the OFDM symbol of the control channel is equal to P times the Cyclic Prefix length of the OFDM symbol of the data channel; the length of OFDM symbol of the control channel is equal one Qth of the length of the OFDM symbol of the data channel; the length of the OFDM symbol of the control channel is equal to P times the length of the OFDM symbol of the data channel; the Cyclic Prefix length of the OFDM symbol of the control channel has a predefined correspondence relationship with the number of OFDM symbol of the control channel; the length of the OFDM symbol of the control channel has a predefined correspondence relationship with the number of the OFDM symbols of the control channel, wherein Q is a positive integer and a value of Q is equal to a ratio of a frequency domain Subcarrier Spacing of the control channel to a frequency domain subcarrier of the data channel, P is greater than one Qth and less than or equal to one.

In an embodiment, the method further includes: determining the parameter configurations of the control channel by at least one of: determining the parameter configurations of the control channel according to a ratio relationship between a frequency domain Subcarrier Spacing of the control channel and a frequency domain Subcarrier Spacing of the data channel; and determining the parameter configurations of the control channel according to the frequency domain resource location of the control channel.

In an embodiment, the specified transmission mode includes: receiving the control information in a control channel region.

In an embodiment, the method further includes: determining a referenced physical resource block corresponding to a physical resource block of the control channel region.

In an embodiment, the predetermined relationship between the specified transmission mode and the data channel includes: the determined referenced physical resource block corresponding to the physical resource block of the control channel region being located in the data channel region where the data channel is located.

In an embodiment, the determined referenced physical resource block is one or more of physical resource blocks in a data channel region at a frequency domain location corresponding to a physical resource block of the control channel region.

In an embodiment, under the condition that it is determined that the physical resource block of the control channel region is an unused physical resource block, the physical resource block of the control channel region is occupied by the data channel corresponding to the referenced physical resource block by default.

In an embodiment, the method further includes: determining the referenced physical resource block by at least one of: a predefined manner; receiving the control channel; receiving a Medium Access Control MAC signaling; and receiving Radio Resource Control RRC signaling.

In an embodiment, the specified transmission mode includes: acquiring the control information by receiving the data channel.

In an embodiment, the control information is acquired by receiving specified one or more of Transmission Blocks in the data channel or by receiving specified one or more of transmission layers in the data channel.

In an embodiment, the data channel is received according to a limited Modulation and coding scheme MCS value range.

In an embodiment, the referenced data channel of the data channel carrying the control information is determined, and the transmission parameters of the data channel carrying the control information are determined according to the referenced data channel.

In an embodiment, the transmission parameter includes at least one of: a time-frequency resource occupied by the data channel transmission; a transmission scheme MCS adopted by the data channel transmission; a Modulation and coding scheme adopted by the data channel transmission; a beam adopted by the data channel transmission; and a demodulation reference signal resource associated with the data channel.

In an embodiment, the demodulation reference signal resource includes two sets of demodulation reference signal resources, wherein the two sets of demodulation reference signal resources are configured to demodulate the data channel carrying control information and referenced data channel, respectively.

In an embodiment, the method further includes: receiving the data information through the data channel.

In an embodiment, the method further includes: determining a demodulation reference signal, and determining the control information before a start position of a time domain and/or the frequency domain location of the demodulation reference signal and the data information after the start position of the time domain and/or the frequency domain location of the demodulation reference signal.

In an embodiment, the method further includes: determining the demodulation reference signal resource of the data channel including a basic demodulation reference signal resource and an extended demodulation reference signal resource, wherein the control information carried in the data channel is demodulated according to the basic demodulation reference signal resource, the data information carried in the data channel is demodulated according to the extended demodulation reference signal resource, the basic demodulation reference signal resource is located at the start position of the time domain and/or frequency domain of the control information transmission in the data channel, and the extended demodulation reference signal resource is located at the start position of the time domain and/or frequency domain of the data information transmission in the data channel.

In an embodiment, the method further includes: determining two sets of encoding rates assigned for the data channel, wherein the two sets of encoding rates are configured to transmit the control information and data information, respectively; and determining two sets of power parameters assigned for the data channel, wherein the two sets of power parameters are configured to transmit the control information and data information, respectively.

In an embodiment, the data channel is located in a scheduling time unit for control information transmission, wherein the scheduling time unit includes one or more time units, and each time unit includes one of: a time slot, minislot, an Orthogonal Frequency Division Multiplexing OFDM symbol, a sub-frame and a frame.

According to another embodiment of the disclosure, there is provided a transmission device for control information, including a transmission module, configured to transmit control information according to a specified transmission mode, wherein the specified transmission mode has a predetermined relationship with a data channel.

In an embodiment, the data channel is located in a scheduling time unit for control information transmission, wherein the scheduling time unit includes one or more time units, and each time unit includes one of: a time slot, minislot, an Orthogonal Frequency Division Multiplexing OFDM symbol, a sub-frame and a frame.

According to another embodiment of the disclosure, there is provided a base station including the transmission device for control information in any one of the embodiments as set forth above.

According to another embodiment of the disclosure, there is provided a receiving device for control information, including a receiving module, configured to receive control information according to a specified transmission mode, wherein the specified transmission mode has a predetermined relationship with a data channel.

In an embodiment, the data channel is located in a scheduling time unit for control information transmission, wherein the scheduling time unit includes one or more time units, and each time unit includes one of: a time slot, minislot, an Orthogonal Frequency Division Multiplexing OFDM symbol, a sub-frame and a frame.

According to another embodiment of the disclosure, there is provided a terminal including the receiving device for control information in any one of the embodiments as set forth above.

According to still another embodiment of the disclosure, there is provided a storage medium. The storage medium is configured to store program code performing one or a combination of the steps of the above method for transmitting control information.

According to the disclosure, since the control information is transmitted according to the specified transmission mode and there is the predetermined relationship between the specified transmission mode and the data channel, the complexity of the communication channel design and the complexity of the user reception can be effectively reduced, At the same time, the signaling overhead can be reduced. The flexible and effective transmission multiplexing mode of the control information and data information can be realized, thereby effectively solving the problems of the high complexity of communication channel design and the user reception and the heavy signaling overhead in the related art.

BRIEF DESCRIPTION OF THE DRAWINGS

The drawings illustrated herein are provided to further understand the disclosure and form a part of this disclosure. The illustrative embodiments of the disclosure and the description thereof are used for explaining the present disclosure and do not constitute an undue limitation. In the drawing.

DETAILED DESCRIPTION OF THE EMBODIMENTS

In order that the objectives, technical solutions and advantages of the present disclosure become more apparent, the present disclosure will be further described in detail below with reference to the accompanying drawings. It should be noted that embodiments of the present disclosure and features in the embodiments may be combined with each other without conflict.

It should be noted that the terms "first", "second" and the like in the specification and claims of the present disclosure and the above-mentioned drawings are used to distinguish similar objects, and are not necessarily intended to describe a specific order or prioritization.

Figure 1:
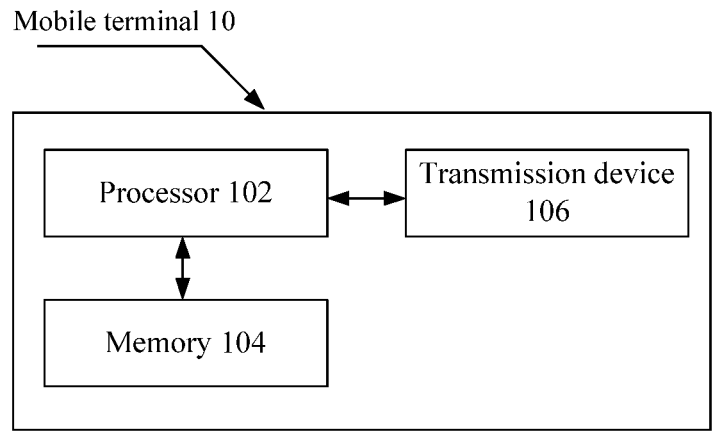
FIG. 1 is a block diagram showing a hardware structure of a mobile terminal for a method for receiving control information according to an embodiment of the present disclosure.

A method embodiment provided in the embodiments of the present disclosure may be performed in a base station, and a method embodiment may be performed in a computing apparatus such as a mobile terminal, a computer terminal, or the like. Taking the mobile terminal as an example, FIG. 1 is a block diagram showing a hardware structure of a mobile terminal for a method for receiving control information according to an embodiment of the present disclosure. As shown in FIG. 1, the mobile terminal 10 may include at least one (only one shown in FIG. 1) processor 102 (processor 102 may include, but is not limited to, a processing device such as a microprocessor MCU or a programmable logic device FPGA), a memory 104 for storing data, and a transmission device 106 for communication functions. It will be understood by those skilled in the art that the structure shown in FIG. 1 is merely illustrative and does not limit the structure of the above electronic device. For example, the mobile terminal 10 may also include more or fewer components than those shown in FIG. 1, or have a different configuration than that shown in FIG. 1

The memory 104 can be configured to store software programs and modules of application software, such as program instructions/modules corresponding to the method for receiving control information in the embodiment of the present disclosure, and the processor 102 runs the software program and the module stored in the memory 104 to perform various functional applications and data processing to implement the above method. The memory 104 may include high speed random access memory, and may also include non-volatile memory such as one or more magnetic storage devices, flash memory, or other non-volatile solid state memory. In some examples, the memory 104 may further include memory remotely located relative to processor 102, which may be connected to the mobile terminal 10 over a network. Examples of such a network include, but are not limited to, the Internet, intranet, local area network, mobile communication network, and combinations thereof.

The transmission device 106 is configured to receive or transmit data via a network. A specific example of the above-described network may include a wireless network provided by a communication provider of the mobile terminal 10. In one example, the transmission device 106 includes a Network Interface Controller (NIC) that can be connected to other network devices through a base station to communicate with the Internet. In one example, the transmission device 106 can be a Radio Frequency (RF) module for communicating with the Internet wirelessly.

Figure 2:
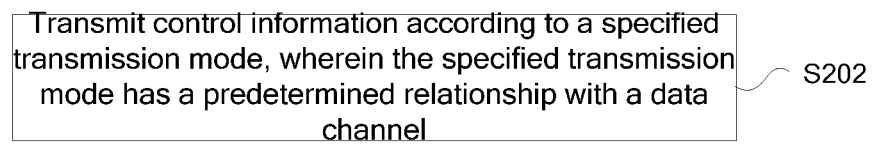
FIG. 2 is a flowchart of a method for transmitting control information according to an embodiment of the present disclosure.

FIG. 2 is a flowchart of a method for transmitting control information according to an embodiment of the present disclosure. As shown in FIG. 2, this process includes a step of:

Step S202, transmitting control information according to a specified transmission mode, wherein the specified transmission mode has a predetermined relationship with a data channel.

Herein, the above operation may be performed by a base station. The base station can transmit control information according to a specified transmission mode, and the specified transmission mode is related to the data channel. Since the control information is transmitted according to the specified transmission mode and there is the predetermined relationship between the specified transmission mode and the data channel, the complexity of the communication channel design and the complexity of the user reception can be effectively reduced, At the same time, the signaling overhead can be reduced. The flexible and effective transmission multiplexing mode of the control channel and data channel can be realized, thereby effectively solving the problems of the high complexity of communication channel design and the user reception and the heavy signaling overhead in the related art.

In an optional embodiment, there may be a plurality of specified transmission modes, one of which may include: carrying the control information in the control channel for transmission.

In an optional embodiment, the method further includes: assigning a plurality of parameter configurations (numerology) for the control channel. In this embodiment, the step of assigning a plurality of configuration parameters for the control channel may be performed before the control information is transmitted in accordance with the specified transmission mode. It should be noted that, in practice, a parameter configuration may also be assigned for the control channel according to a desirable condition. Optionally, the parameter configurations may be pre-appointed by the base station and the terminal, or indicated by the base station to the terminal. For example, the base station may indicate to the terminal by signaling.

In an optional embodiment, the predetermined relationship between the specified transmission mode and the data channel may include: a correspondence relationship between a parameter configuration of the control channel and a parameter configuration of the data channel.

In an optional embodiment, the parameter configuration of the control channel (i.e., the parameter configuration assigned for the control channel) includes at least one of: a symbol length in a time domain of a specified time-frequency domain resource (for example, a length of each OFDM symbol), a Cyclic Prefix (CP) length of the Orthogonal Frequency Division Multiplexing OFDM symbol, the number of Orthogonal Frequency Division Multiplexing OFDM symbol, corresponding frequency domain Subcarrier Spacing (SCS), the number of frequency domain subcarrier, and a proportion of the Cyclic Prefix in the Orthogonal Frequency Division Multiplexing OFDM symbol. The parameter configuration of the control channel refers to a configuration of (one or all of) parameters such as the symbol length, the CP length, the number of symbols included, the corresponding Subcarrier Spacing, which correspond to the time-frequency domain resource occupied by the control channel transmission; and the parameter configuration of the data channel refers to a configuration of (one or all of) parameters such as the symbol length, the CP length, the number of symbols included, the corresponding Subcarrier Spacing, which correspond to the time-frequency domain resource occupied by the data channel transmission. Preferably, the time domain resource occupied by the control channel transmission is a control channel region in a current scheduling time unit, and the frequency domain resource is one or more sub-bands for control channel transmission. Preferably, the time domain resource occupied by the data channel transmission is a data channel region in a current scheduling time unit, and the frequency domain resource is a frequency domain resource for data channel transmission. Optionally, in this embodiment, the control channel region is a time domain or a time-frequency domain resource region configured by the base station mainly to transmit the control channel, and the data channel region is a time domain or a time-frequency domain resource region configured by the base station mainly to transmit the data channel.

In an optional embodiment, the parameter configuration of the data channel may include at least one of: a Cyclic Prefix length of Orthogonal Frequency Division Multiplexing OFDM symbol, a length of Orthogonal Frequency Division Multiplexing OFDM symbol, the number of Orthogonal Frequency Division Multiplexing OFDM symbol, frequency domain Subcarrier Spacing; the number of frequency domain subcarrier; and a proportion of the Cyclic Prefix in Orthogonal Frequency Division Multiplexing OFDM symbol.

In an optional embodiment, the Cyclic Prefix length of the OFDM symbol of the control channel and the number or length of the OFDM symbol of the control channel have a predefined correspondence relationship with the Cyclic Prefix length of the OFDM symbol of the data channel. In this embodiment, the predefined correspondence relationship means that the base station and the terminal make an agreement in advance, for example, a correspondence relationship between parameter configuration of control channels and parameter configuration of data channels is defined through a table, and this table is known to the base station and the terminal.

In an optional embodiment, the predefined correspondence relationship includes at least one of: the Cyclic Prefix length of the OFDM symbol of the control channel is equal to one Qth of the Cyclic Prefix length of the OFDM symbol of the data channel; the Cyclic Prefix length of the OFDM symbol of the control channel is equal to P times the Cyclic Prefix length of the OFDM symbol of the data channel; the length of OFDM symbol of the control channel is equal one Qth of the length of the OFDM symbol of the data channel; the length of the OFDM symbol of the control channel is equal to P times the length of the OFDM symbol of the data channel; the Cyclic Prefix length of the OFDM symbol of the control channel has a predefined correspondence relationship with the number of OFDM symbol of the control channel; and the length of the OFDM symbol of the control channel has a predefined correspondence relationship with the number of the OFDM symbols of the control channel, wherein Q is a positive integer and a value of Q is equal to a ratio of a frequency domain Subcarrier Spacing of the control channel to a frequency domain subcarrier of the data channel, and P is greater than one Qth and less than or equal to one. Optionally, Q is an integer greater than one. Specifically, when the CP length of the data channel is Cp_len and the Subcarrier Spacing of the control channel is Q times the Subcarrier Spacing of the data channel, the predefined correspondence relationship includes at least one of: the Cyclic Prefix length of at least one of parameter configurations of the control channel is equal to one Qth of Cp_len; the Cyclic Prefix length of the parameter configuration of the control channel is greater than or equal to one Qth of Cp_len; and the Cyclic Prefix length of the parameter configuration of the control channel is less than or equal to Cp_len. Specifically, when the length of the OFDM symbol of the data channel is Data_len and the Subcarrier Spacing of the control channel is Q times the Subcarrier Spacing of the data channel, the predetermined correspondence relationship includes at least one of: the length of the OFDM symbol of at least one of parameter configurations of the control channel is equal to one Qth of Data_len; the length of the OFDM symbol of the parameter configuration of the control channel is greater than or equal to one Qth of Data_len; and the length of the OFDM symbol of the parameter configuration of the control channel is less than or equal to Data_len.

In an optional embodiment, the parameter configurations may be assigned for the control channel by at least one of: assigning the parameter configurations for the control channel according to a ratio relationship between a frequency domain Subcarrier Spacing (SCS) of the control channel and a frequency domain Subcarrier Spacing (SCS) of the data channel, wherein specifically, for each ratio relationship, the parameter configurations are assigned for the control channel and in the case of different ratio relationships, the parameter configurations may be different, for example, in the case of the ratio relationship A, the parameter configurations assigned for the control channel are {parameter configuration A1, parameter configuration A2, parameter configuration A3}, and in the case of the ratio relationship B, the parameter configurations assigned for the control channel are {Parameter configuration B1, parameter configuration B2, parameter configuration B3}; and assigning the parameter configurations for the control channel according to a frequency domain resource location of the control channel, wherein preferably, the frequency domain resource location may be a frequency domain sub-band location wherein a sub-band (or a frequency domain sub-band) of the control channel includes one or more physical resource blocks in the frequency domain. For example, for sub-band I, the parameter configurations assigned for the control channel on the sub-band I are {parameter configuration I1, parameter configuration I2}, and for sub-band J, the parameter configurations assigned for the control channel on the sub-band J are {parameter configuration J1, parameter configuration J2}.

In an optional embodiment, the specified transmission mode may also include: carrying control information in a control channel region for transmission. In this embodiment, the control channel region generally refers to a time domain resource region specified in a scheduling time unit that can be used to transmit the control channel.

In an optional embodiment, when the control information is carried in the control channel for transmission, the method further includes: assigning a referenced physical resource block for the physical resource block of the control channel region. In this embodiment, the step of assigning the referenced physical resource block for the physical resource block of the control channel region may be executed before the control information is transmitted according to the specified transmission mode. Optionally, the referenced physical resource block may be pre-appointed by the base station and the terminal or indicated by the base station to the terminal. For example, the base station may indicate to the terminal by signaling.

In an optional embodiment, the predetermined relationship between the specified transmission mode and the data channel may include: the referenced physical resource block being located in the data channel region where the data channel is located. In this embodiment, the data channel region generally refers to a time-frequency resource region specified in a scheduling time unit that can be used to transmit the data channel. For example, in LTE, the first N (a value of N is a non-negative integer than 5) OFDM symbols in a normal sub-frame are control channel regions, and the last 14-N OFDM symbols are data channel regions. In this embodiment, the physical resource block of the control channel region is an unused physical resource block in the frequency domain in the control channel region.

In an optional embodiment, the physical resource block of the referenced data channel is one or more of physical resource blocks of the data channel at the same frequency domain location corresponding to the physical resource block of the control channel. Preferably, the Subcarrier Spacing (SCS) of the control channel is greater than the SCS of the data channel, such that a PRB frequency domain resource location of the control channel will correspond to one or more PRBs of the data channel. The physical meaning of the arrangement of the physical resource block of the referenced data channel is that the data channel corresponding to the physical resource block of the referenced data channel region is allowed to be transmitted on the physical resource block of the control channel. When the terminal receives the data channel, the unused PRB in the control channel region corresponding to the frequency domain location of the data channel is also used for the transmission of the data channel by default. Preferably, the terminal may determine, by receiving the signaling indications from the base station, which physical resource blocks in the control channel region are physical resource blocks not used by the control channel; or the terminal may determine, by means of blind detection, whether the physical resource blocks of the control channel are unused physical resource blocks.

In an optional embodiment, the referenced physical resource block may be determined by at least one of: a predefined manner (i.e., the base station and the terminal may make an agreement in advance); a control channel notification; a Medium Access Control (MAC) signaling notification; and a Radio Resource Control (RRC) signaling notification.

In an optional embodiment, the specified transmission mode may further include: carrying the control information in the data channel for transmission.

In an optional embodiment, the predetermined relationship between the specified transmission mode and the data channel may include: carrying the control information in the data channel for transmission.

In an optional embodiment, the control information is carried on specified one or more of Transmission Blocks (TBs) of the data channel for transmission; or the control information is carried on specified one or more of transmission layers of the data channel for transmission.

In an optional embodiment, the method further includes: assigning a limited Modulation and coding scheme (MCS) value range for the data channel. In this embodiment, the limited MCS value range may be pre-appointed by the base station and the terminal, or indicated by the base station to the terminal. Herein, when the base station indicates it to the terminal, the indication method includes: indicating, by high layer signaling or MAC signaling, the limited MCS value range to the terminal. Optionally, different UEs may correspond to different limited MCS value ranges.

In an optional embodiment, a referenced data channel may be assigned for the data channel carrying the control information, wherein the referenced data channel carries data information, and the data channel carrying the control information and the referenced data channel share a set of transmission parameters. Optionally, the referenced data channel may be pre-appointed by the base station and the terminal, or indicated by the base station to the terminal. For example, the base station may indicate to the terminal by signaling.

In an optional embodiment, the transmission parameter includes at least one of: a time-frequency resource occupied by the data channel transmission; a transmission scheme adopted by the data channel transmission; a Modulation and coding scheme MCS adopted by the data channel transmission; a beam adopted by the data channel transmission; and a demodulation reference signal resource associated with the data channel. Optionally, in this embodiment, the beam may be understood as an analog beam, or an analog pre-coding weight, a pre-coding weight, a reference signal (pilot frequency) resource, a quasi-common (QCL) information, or the like. Optionally, the shared set of transmission parameters may be indicated by a set of signaling instruction, that is, the transmission parameters of the data channel carrying the control information and the referenced data channel are indicated by a set of signaling, or in other words, the terminal may determine the transmission parameters of the data channel carrying the control information according to transmission parameter information of the referenced data channel.

In an optional embodiment, the demodulation reference signal resource includes two sets of demodulation reference signal resources, wherein the two sets of demodulation reference signal resources are used to transmit the data channel carrying control information and referenced data channel, respectively. Specifically, the base station may separately assign two sets of demodulation reference signal resources for the data channel carrying the control information and the referenced data channel, and the terminal receives and acquires the data channel carrying control information and the referenced data channel, respectively, by the two sets of demodulation reference signal resources. The demodulation reference signal resources herein include a demodulation reference signal pattern (instant frequency resource), a demodulation reference signal port, a demodulation reference signal sequence, and the like. Preferably, the two sets of demodulation reference signal resources are two sets of demodulation reference signal ports, or are the same sets of demodulation reference signal ports which employ two sets of different scrambling codes to scramble the sequences corresponding to the demodulation reference signal ports.

In an optional embodiment, the data channel carrying the control information may also carry data information.

In an optional embodiment, the demodulation reference signal may be assigned after the time domain and/or the frequency domain location of the control information carried in the data channel, and the data information may be assigned after a start position of a time domain and/or frequency domain location of the demodulation reference signal.

In an optional embodiment, a basic demodulation reference signal resource and an extended demodulation reference signal resource may be assign for the data channel, wherein the basic demodulation reference signal resource is located at the start position of the time domain and/or frequency domain of the control information transmission in the data channel, and the extended demodulation reference signal resource is located at the start position of the time domain and/or frequency domain of the data information transmission in the data channel.

In an optional embodiment, the method further includes at least one of: assigning two sets of encoding rates for the data channel, wherein the two sets of encoding rates are configured to transmit the control information and data information, respectively; and assigning two sets of power parameters for the data channel, wherein the two sets of power parameters are configured to transmit the control information and data information, respectively.

In an optional embodiment, the data channel is located in a scheduling time unit for control information transmission, wherein the scheduling time unit includes one or more time units, and each time unit includes one of: a time slot, minislot, an Orthogonal Frequency Division Multiplexing OFDM symbol, a sub-frame and a frame. Preferably, the data channel and the control information may be directed only to the same terminal, that is, the data channel and the control information are data channel and control information of the same terminal. Preferably, the control information may be configured to indicate a transmission parameter of the data channel, wherein the transmission parameter includes at least one of: a time-frequency resource occupied by the data channel transmission; a transmission scheme adopted by the data channel transmission; a Modulation and coding scheme MCS adopted by the data channel transmission; a beam adopted by the data channel transmission; a demodulation reference signal resource associated with the data channel; and a power parameter of the data channel.

It should be noted that the term "specified" used in the description of the embodiments of the present disclosure, unless otherwise explained, means that the "specified" describes an object known to both the base station and the terminal, which may be pre-appointed by the base station and the terminal or indicated by the base station to the terminal. The term "predefined" used in the description of the embodiments of the present disclosure, unless otherwise explained, means that the "predefined" describes an object known to both the base station and the terminal, which may be pre-appointed by the base station and the terminal.

The embodiments are described from the base station side. Operations on the terminal side will be described below. It should be noted that, in embodiments described on the terminal side, description of some features may be similar to the features in the embodiments on the base station side and will be omitted in the following description.

Figure 3:
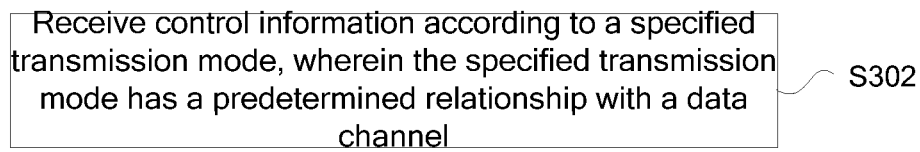
FIG. 3 is a flowchart of a method for receiving control information according to an embodiment of the present disclosure.

FIG. 3 is a flowchart of a method for receiving control information according to an embodiment of the present disclosure. As shown in FIG. 3, this process includes a step of:

Step S302, receiving control information according to a specified transmission mode, wherein the specified transmission mode has a predetermined relationship with a data channel.

Herein, the above operation may be performed by a terminal. Since the received control information is transmitted according to the specified transmission mode and there is the predetermined relationship between the predetermined transmission mode and the data channel, the complexity of the communication channel design and the complexity of the user reception can be effectively reduced. At the same time, the signaling overhead can be reduced. The flexible and effective transmission multiplexing mode of the control channel and data channel can be realized, thereby effectively solving the problems of the high complexity of communication channel design and the user reception and the heavy signaling overhead in the related art.

In an optional embodiment, there may be a plurality of specified transmission modes, one of which may include: receiving the control information by receiving a control channel.

In an optional embodiment, the method further includes: determining a plurality of parameter configurations of the control channel. In this embodiment, a receiving end (for example, the terminal) may determine the parameter configurations of the control channel in an appointed manner in advance with a transmitting end (for example, the base station), or may determine the parameter configurations of the control channel by receiving an indication from the base station.

In an optional embodiment, the predetermined relationship between the specified transmission mode and the data channel includes: a correspondence relationship between the parameter configuration of the control channel and the parameter configuration of the data channel. In this embodiment, the base station may configure one or more configuration parameters for the control channel.

In an optional embodiment, each of the parameter configuration of the control channel and the parameter configuration of the data channel includes at least one of: a Cyclic Prefix length of Orthogonal Frequency Division Multiplexing OFDM symbol; a length of Orthogonal Frequency Division Multiplexing OFDM symbol; the number of Orthogonal Frequency Division Multiplexing OFDM symbol; frequency domain Subcarrier Spacing; the number of frequency domain subcarrier; and a proportion of Cyclic Prefix in Orthogonal Frequency Division Multiplexing OFDM symbol.

In an optional embodiment, the method further includes: determining, according to a relationship between a Cyclic Prefix of OFDM symbol of the data channel and a Cyclic Prefix of OFDM symbol of the control channel, the number or length of OFDM symbol of the control channel; or determining, according to a relationship between a length of OFDM symbol of the data channel and a length of OFDM symbol of the control channel, the number or length of OFDM symbol of the control channel, wherein the Cyclic Prefix of the OFDM symbol and the number or length of the OFDM symbol of the control channel have a predefined correspondence relationship with the Cyclic Prefix of the OFDM symbol of the data channel.

In an optional embodiment, the predefined correspondence relationship includes at least one of: the Cyclic Prefix length of the OFDM symbol of the control channel is equal to one Qth of the Cyclic Prefix length of the OFDM symbol of the data channel; the Cyclic Prefix length of the OFDM symbol of the control channel is equal to P times the Cyclic Prefix length of the OFDM symbol of the data channel; the length of OFDM symbol of the control channel is equal one Qth of the length of the OFDM symbol of the data channel; the length of the OFDM symbol of the control channel is equal to P times the length of the OFDM symbol of the data channel; the Cyclic Prefix length of the OFDM symbol of the control channel has a predefined correspondence relationship with the number of OFDM symbol of the control channel; the length of the OFDM symbol of the control channel has a predefined correspondence relationship with the number of the OFDM symbols of the control channel, wherein Q is a positive integer and a value of Q is equal to a ratio of a frequency domain Subcarrier Spacing of the control channel to a frequency domain subcarrier of the data channel, P is greater than one Qth and less than or equal to one. Optionally, Q is an integer greater than one.

In an optional embodiment, the method further includes: determining the parameter configurations of the control channel by at least one of: determining the parameter configurations of the control channel according to a ratio relationship between a frequency domain Subcarrier Spacing (SCS) of the control channel and a frequency domain Subcarrier Spacing (SCS) of the data channel; and determining the parameter configurations of the control channel according to the frequency domain resource location of the control channel.

In an optional embodiment, the specified transmission mode may include: receiving the control information in a control channel region. In this embodiment, the control channel region generally refers to a time domain resource region specified in a scheduling time unit that can be used to transmit the control channel.

In an optional embodiment, the method may further include: determining a referenced physical resource block corresponding to a physical resource block of the control channel region.

In an optional embodiment, the predetermined relationship between the specified transmission mode and the data channel may include: the determined referenced physical resource block corresponding to the physical resource block of the control channel region being located in the data channel region where the data channel is located.

In an optional embodiment, the determined referenced physical resource block is one or more of physical resource blocks in a data channel region at a frequency domain location corresponding to a physical resource block of the control channel region.

In an optional embodiment, if it is determined that the physical resource block of the control channel region is an unused physical resource block, the physical resource block of the control channel region is occupied by the data channel corresponding to the referenced physical resource block by default.

In an optional embodiment, the method further includes: determining the referenced physical resource block by at least one of: a predefined manner; receiving the control channel; receiving a Medium Access Control (MAC) signaling; and receiving Radio Resource Control (RRC) signaling.

In an optional embodiment, the specified transmission mode includes: acquiring the control information by receiving the data channel.

In an optional embodiment, the predetermined relationship between the specified transmission mode and the data channel may include: carrying the control information in the data channel for transmission.

In an optional embodiment, the control information is acquired by receiving specified one or more of Transmission Blocks (TBs) in the data channel or by receiving specified one or more of transmission layers in the data channel.

In an optional embodiment, the data channel is received according to a limited Modulation and coding scheme (MCS) value range. In this embodiment, the limited MCS value range may be pre-appointed by the base station and the terminal, or indicated by the base station to the terminal. Herein, when the base station indicates it to the terminal, the indication method includes: indicating, by high layer signaling or MAC signaling, the limited MCS value range to the terminal. Optionally, different UEs may correspond to different limited MCS value ranges.

In an optional embodiment, the referenced data channel of the data channel carrying the control information is determined, and the transmission parameters of the data channel carrying the control information are determined according to the referenced data channel.

In an optional embodiment, the transmission parameter includes at least one of: a time-frequency resource occupied by the data channel transmission; a transmission scheme adopted by the data channel transmission; a Modulation and coding scheme MCS adopted by the data channel transmission; a beam adopted by the data channel transmission; and a demodulation reference signal resource associated with the data channel.

In an optional embodiment, the demodulation reference signal resource includes two sets of demodulation reference signal resources, wherein the two sets of demodulation reference signal resources are configured to demodulate the data channel carrying control information and referenced data channel, respectively.

In an optional embodiment, the data information can also be received through the data channel.

In an optional embodiment, the method further includes: determining a demodulation reference signal, and determining the control information before a start position of a time domain and/or the frequency domain location of the demodulation reference signal and the data information after the start position of the time domain and/or the frequency domain location of the demodulation reference signal.

In an optional embodiment, the method further includes: determining the demodulation reference signal resource of the data channel including a basic demodulation reference signal resource and an extended demodulation reference signal resource, wherein the control information carried in the data channel is demodulated according to the basic demodulation reference signal resource, the data information carried in the data channel is demodulated according to the extended demodulation reference signal resource, the basic demodulation reference signal resource is located at the start position of the time domain and/or frequency domain of the control information transmission in the data channel, and the extended demodulation reference signal resource is located at the start position of the time domain and/or frequency domain of the data information transmission in the data channel.

In an optional embodiment, the method further includes at least one of: determining two sets of encoding rates assigned for the data channel, wherein the two sets of encoding rates are configured to transmit the control information and data information, respectively; and determining two sets of power parameters assigned for the data channel, wherein the two sets of power parameters are configured to transmit the control information and data information, respectively.

In an optional embodiment, the data channel is located in a scheduling time unit for control information transmission, wherein the scheduling time unit includes one or more time units, and each time unit includes one of: a time slot, minislot, an Orthogonal Frequency Division Multiplexing OFDM symbol, a sub-frame and a frame.

The disclosure will be described in detail below in conjunction with specific embodiments:

First Specific Embodiment

The base station assigns (or "configures") a plurality of CP lengths and the number of OFDM symbol for the control channel, wherein assignment of the CP lengths of the control channel and the number of OFDM symbol may varies with the relationship between the Subcarrier Spacing of the data channel and the Subcarrier Spacing of the control channel.

Figure 4A:
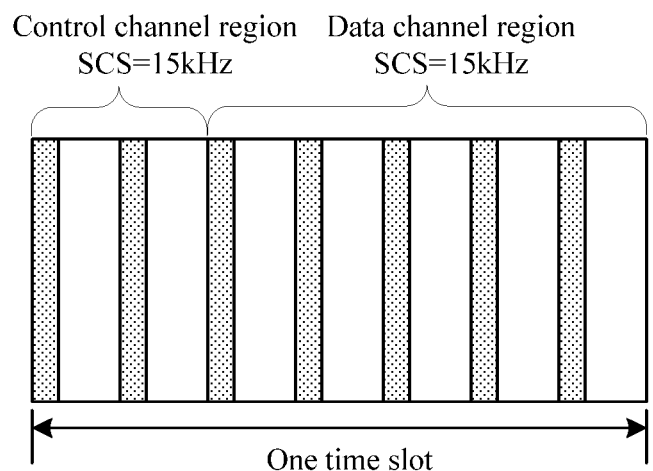
FIG. 4A is a first schematic diagram of a parameter configuration structure of a control channel and a parameter configuration structure of a data channel according to an embodiment of the present disclosure.
Figure 4B:
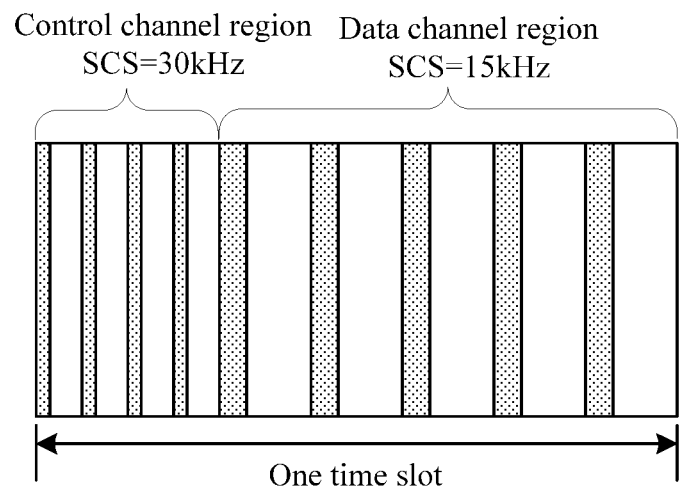
FIG. 4B is a second schematic diagram of a parameter configuration structure of the control channel and a parameter configuration structure of the data channel according to an embodiment of the present disclosure.
Figure 4C:
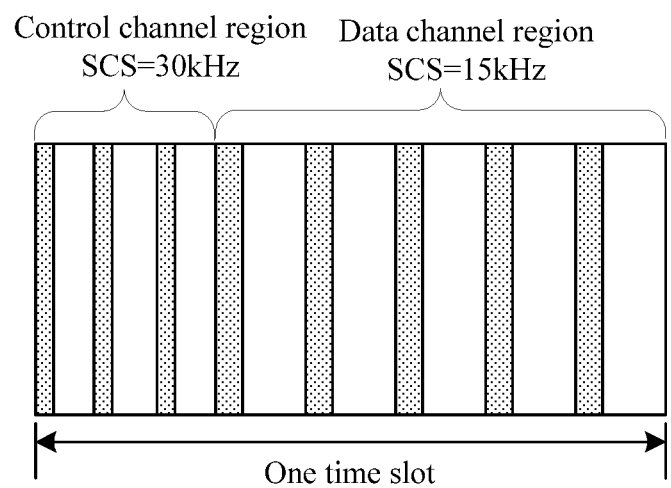
FIG. 4C is a third schematic diagram of a parameter configuration structure of the control channel and a parameter configuration structure of the data channel according to an embodiment of the present disclosure.

As shown in FIGS. 4A, 4B, and 4C, it is assumed that a scheduling time unit of a base station is a time slot including 7 symbols. As shown in FIG. 4A, it is assumed that Subcarrier Spacing (SCS) of the control channel and Subcarrier Spacing (SCS) of the data channel each are 15 kHz, wherein the first two symbols are control channel regions, and the remaining five symbols are data channel regions.

When the Subcarrier Spacing of the data channel region is unchanged and the Subcarrier Spacing of the control channel region is 60 kHz, the CP length of the control channel, the number of OFDM symbol of the control channel, and the CP of the data channel satisfy a relationship $$\left(\eta = \frac{\text{Control Channel } SCS}{\text{Data Channel } SCS} = 4\right),$$

as shown in Table 1 below.

TABLE 1

| CP Length of Control Channel | Number of Control Channel OFDM Symbols | CP Length of Data Channel |
|---|---|---|
| $\frac{1}{\eta} \times \text{CP\_len}$ | 2 → 8 | CP_len |
| $\frac{2}{\eta} \times \text{CP\_len}$ | 2 → 6 | |
| $\frac{3}{\eta} \times \text{CP\_len}$ | 2 → 4 | |
| $1 \times \text{CP\_len}$ | 2 → 2 | |

Herein, when the CP length of the control channel is $$\frac{1}{\eta}$$

of the CP length of the data channel (equal to a ratio of the Subcarrier Spacing of the data channel to the Subcarrier Spacing of the control channel), the number of OFDM symbol of the control channel is changed from 2 as initial (i.e., the corresponding Subcarrier Spacing is 15 kHz) to 8=2·η (the expansion multiple is equal to the ratio of the CP length of the data channel to the CP length of the control channel); when the CP length of the control channel is $$\frac{2}{\eta}$$

of the CP length of the data channel (more than the ratio of the Subcarrier Spacing of the data channel to the Subcarrier Spacing of the control channel, and the CP length of the control channel being less than the CP length of the data channel), the number of OFDM symbol of the control channel is changed from 2 as initial (i.e., the corresponding Subcarrier Spacing is 15 kHz) to 6 (more than the number of OFDM symbol when the SCS is 15 kHz, and less than the number of OFDM symbol after the number of symbols is expanded by η multiples when the SCS is 15 kHz); when the CP length of the control channel is $$\frac{3}{\eta}$$

of the CP length of the data channel (more than the ratio of the Subcarrier Spacing of the data channel to the Subcarrier Spacing of the control channel, and the CP length of the control channel being less than the CP length of the data channel), the number of OFDM symbol of the control channel is changed from 2 as initial (i.e., the corresponding Subcarrier Spacing is 15 kHz) to 4 (more than the number of OFDM symbol when the SCS is 15 kHz, and less than the number of OFDM symbol after the number of symbols is expanded by η multiples when the SCS is 15 kHz); and when the CP length of control channel is equal to the CP length of the data channel, the number of OFDM symbol of the control channel is equal to 2 as initial.

When the Subcarrier Spacing of the data channel region is unchanged and the Subcarrier Spacing of the control channel region is 30 kHz, the CP length of the control channel, the number of OFDM symbol of the control channel, and the CP of the data channel satisfy a relationship $$\left( \eta = \frac{\text{Control Channel } SCS}{\text{Data Channel } SCS} = 2 \right),$$

as shown in Table 2 below.

TABLE 1

| CP Length of Control Channel | Number of Control Channel OFDM Symbols | CP Length of Data Channel |
|---|---|---|
| $\frac{1}{h} \times \text{CP\_len}$ | 2 → 4 | CP_len |
| $\frac{2}{3} \times \text{CP\_len}$ | 2 → 3 | |

Herein, when the CP length of the control channel is $$\frac{1}{\eta}$$

of the CP length of the data channel (equal to a ratio η of the Subcarrier Spacing of the data channel to the Subcarrier Spacing of the control channel), the number of OFDM symbol of the control channel is changed from 2 as initial (i.e., the corresponding Subcarrier Spacing is 15 kHz) to 4 (the expansion multiple is equal to the ratio of the CP length of the data channel to the CP length of the control channel), as shown in FIG. 4B; and when the CP length of the control channel is ⅔ of the CP length of the data channel (more than the ratio of the Subcarrier Spacing of the data channel to the Subcarrier Spacing of the control channel, and the CP length of the control channel being less than the CP length of the data channel), the number of OFDM symbol of the control channel is changed from 2 as initial (i.e., the corresponding Subcarrier Spacing is 15 kHz) to 3 (more than the number of OFDM symbol when the SCS is 15 kHz, and less than the number of OFDM symbol after the number of symbols is expanded by η multiples when the SCS is 15 kHz), as shown in FIG. 4C.

As another implementation manner of the embodiment of the present disclosure, when the Subcarrier Spacing of the data channel region is unchanged and the Subcarrier Spacing of the control channel region is 60 kHz, the CP length of the control channel, the number of OFDM symbol of the control channel, and the CP of the data channel satisfy a relationship as shown in Table 3 below.

TABLE 3

| CP Length of Control Channel | Number of Control Channel OFDM Symbols | CP Length of Data Channel |
|---|---|---|
| $\frac{1}{4} \times \text{CP\_len}$ | 8(= 2 × 4) | CP_len |
| $\frac{1}{3} \times \text{CP\_len}$ | 6(= 2 × 3) | |

TABLE 3-continued

| CP Length of Control Channel | Number of Control Channel OFDM Symbols | CP Length of Data Channel |
|---|---|---|
| $\frac{1}{2} \times CP\_len$ | 4(= 2 × 2) | |
| 1 × CP_len | 2(= 2 × 1) | |

Herein, when the CP length of the control channel is 4 of the CP length of the data channel (equal to a ratio of the Subcarrier Spacing of the data channel to the Subcarrier Spacing of the control channel), the number of OFDM symbol of the control channel is changed from 2 as initial (i.e., the corresponding Subcarrier Spacing is 15 kHz) to 8 (the expansion multiple is equal to the ratio of the CP length of the data channel to the CP length of the control channel, i.e., the number is expended by 4 multiples); similarly, when the CP length of the control channel is 3 of the CP length of the data channel (more than the ratio of the Subcarrier Spacing of the data channel to the Subcarrier Spacing of the control channel, and satisfying the CP length of the control channel is less than the CP length of the data channel), the number of OFDM symbol of the control channel is changed from 2 as initial (i.e., the corresponding Subcarrier Spacing is 15 kHz) to 6 (the expansion multiple is equal to the ratio of the CP length of the data channel to the CP length of the control channel, i.e., the number is expended by 3 multiples); and when the CP length of the control channel is 2 of the CP length of the data channel (more than the ratio of the Subcarrier Spacing of the data channel to the Subcarrier Spacing of the control channel, and satisfying the CP length of the control channel is less than the CP length of the data channel), the number of OFDM symbol of the control channel is changed from 2 as initial (i.e., the corresponding Subcarrier Spacing is 15 kHz) to 4 (the expansion multiple is equal to the ratio of the CP length of the data channel to the CP length of the control channel, i.e., the number is expended by 2 multiples); and when the CP length of control channel is equal to the CP length of the data channel, the number of OFDM symbol of the control channel is equal to 2 as initial.

The configurations of the CP lengths and the number of OFDM symbol in the control channel may be notified to the terminal in a manner pre-appointed by the base station and the terminal, or by means of broadcast signaling.

The configuration of the CP length of the control channel and the number of OFDM symbol in a current scheduling time unit or a continuous segment of current scheduling time unit is one of the configurations of the CP lengths and OFDM symbol numbers, and the base station may notify the terminal of the information by RRC signaling or MAC signaling or the previous downlink physical control channel.

After receiving the CP length configuration information of the control channel, the terminal can acquire the number of OFDM symbol of the control channel, and then attempt to receive the control channel and the data channel according to the determined number configuration of symbols in the control channel region (when the data channel is multiplexed in the control channel region).

As a further implementation of the embodiment of the present disclosure, the ratio relationship between the SCS of the data channel and the SCS of the control channel and/or the CP length of the control channel and the number of OFDM symbol of the control channel may be separately configured for different frequency domain sub-band resources.

Second Specific Embodiment

This embodiment will describe a resource indication when the data channel and the control channel are multiplexed.

A referenced data channel PRB (Physical Resource Block) is assigned for a PRB in the control channel region, wherein the referenced data channel PRB may include one or more PRBs. The base station indicates unused PRB in the control channel region to the terminal. If the control channel PRB corresponding to the referenced data channel PRB is a PRB that is not used (an unused PRB, or an idle PRB), the data channel allocated in the referenced data channel PRB for transmission can be simultaneously transmitted on the PRB of the control channel corresponding to the referenced data channel PRB.

Optionally, when the parameter configurations (numerology) of the control channel and the data channel are different, a referenced data channel PRB is assigned for an unused physical resource block (PRB) in the control channel region. Herein, the referenced data channel PRB may include one or more PRBs. The data channel allocated in the referenced data channel PRB for transmission can simultaneously adopt the PRB of the control channel corresponding to the referenced data channel PRB.

As a specific implementation in the embodiment of the present disclosure:

The basic principles of multiplexing of the control channel and the data channel are as follows: the base station indicates the idle resource (unused resource) in the control channel region to the terminal, and indicates the frequency domain resource allocated by the data channel to the terminal, such that the terminal approve the idle resources located in the control channel region on the same frequency domain resource corresponding to the data channel frequency domain resources may be used to transmit the data channel by default.

However, when the control channel (region) and the data channel (region) adopt different parameter configurations (numerology), it is ambiguous which data channel (PDSCH) will the unused channel resources in the control channel region be used for.

Figure 5A:
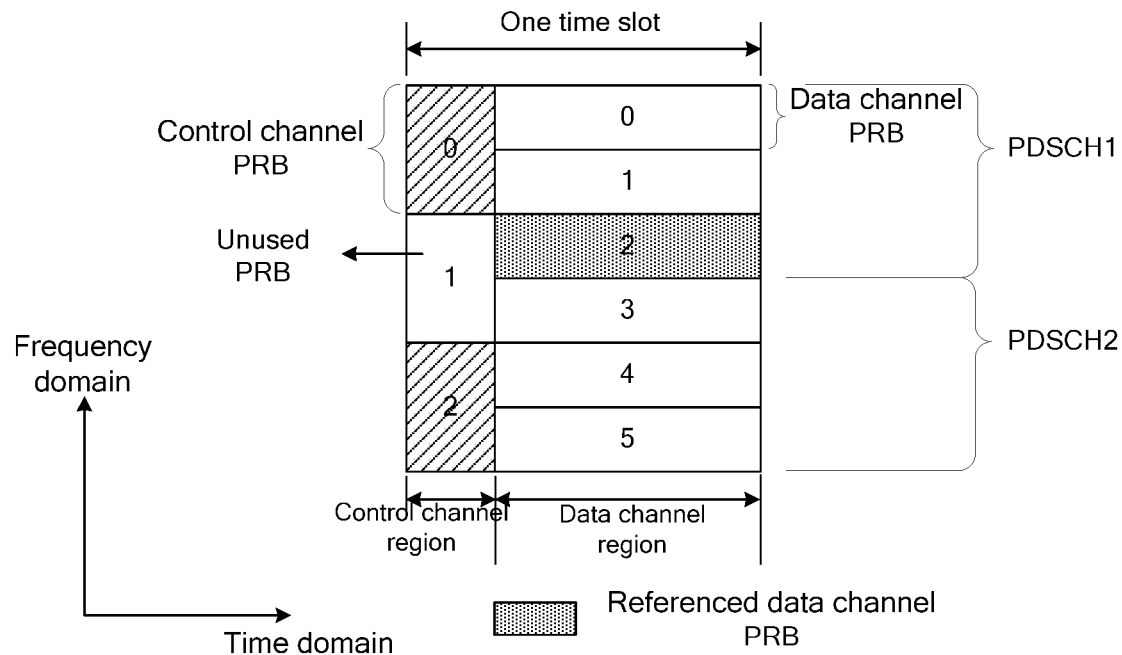
FIG. 5A is a first schematic diagram of a referenced PRB in the data channel corresponding to a PRB that is not used in the control channel according to an embodiment of the present disclosure.
Figure 5B:
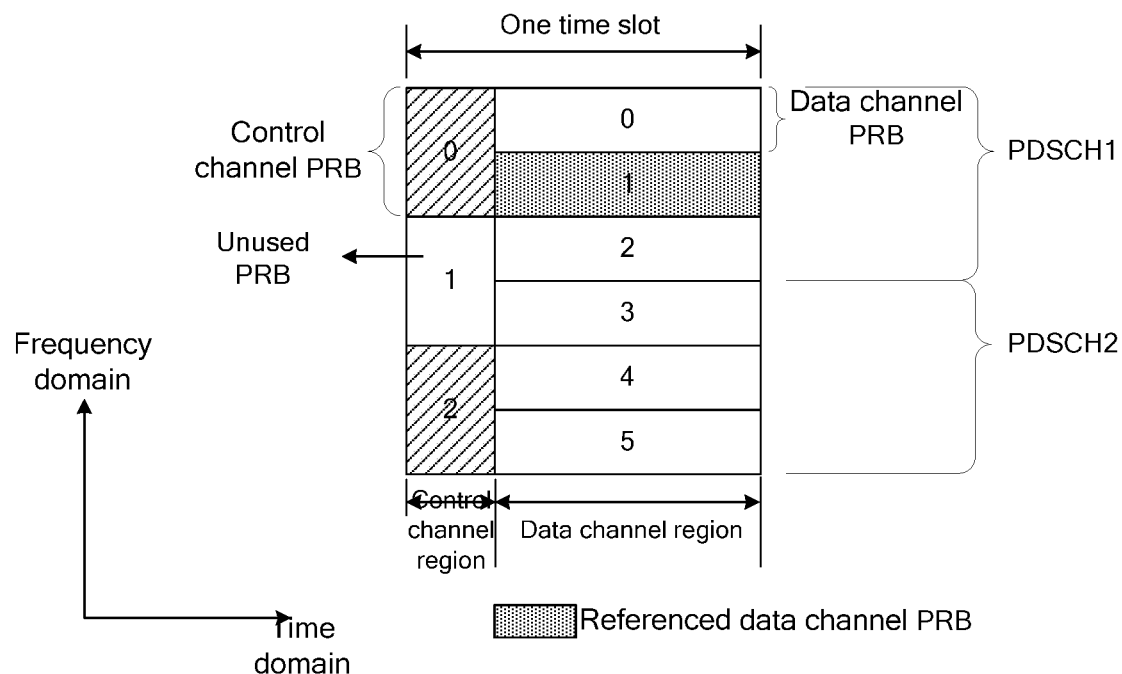
FIG. 5B is a second schematic diagram of a referenced PRB in the data channel corresponding to a PRB that is not used in the control channel according to an embodiment of the present disclosure.

As shown in FIG. 5A and FIG. 5B, the data channel region on the frequency domain resource corresponding to the unused PRB in the control channel region is mapped with two PRBs, wherein one PRB is occupied by PDSCH1, and the other PRB is occupied by PDSCH2. In this case, according to the above-mentioned basic multiplexing principle of the control channel and data channel, the unused PRB corresponds to two data channels PRB on the same frequency domain resource, wherein the unused PRB can be occupied by PDSCH1 or occupied by PDSCH2. Since the minimum allocation granularity of the frequency domain resource of the control channel is 1 PRB, neither the base station nor the terminal can determine whether this unused PRB of the control channel region is used for transmitting PDSCH1 or PDSCH2. It is assumed that the base station transmits PDSCH2 (the data channel of a terminal 2) only on the unused PRB and the terminal receives data according to the PDSCH1 (the data channel of the terminal 1) being transmitted on the unused PRB, the terminal 1 and the terminal 2 both will assume that the wrong resources are mapped to receive their respective data, thus resulting in a negative impact on system performance.

One way to solve the above problem is to assign a referenced data channel PRB for a physical resource blocks (PRB) in the control channel region which is unused. For example, in FIG. 5A and FIG. 5B, the base station indicates to the terminal or makes an agreement in advance with the terminal that the referenced data channel PRB corresponding to an unused physical resource block (PRB1) in the control channel region is PRB2. Then, during the transmission of the base station, the control channel PRB1 will be only used to transmit the data channel PDSCH1. During the reception of the terminal, it will be assumed that the control channel PRB1 is used for data channel PDSCH1 for transmission and mapping, thereby obtaining the correct resource mapping mode and then receiving the data channel and demodulating and decoding.

Optionally, the base station indicates to the terminal or pre-appoints with the terminal the referenced data channel PRB corresponding to each PRB bandwidth in the frequency domain of the control channel region. Optionally, the referenced data channel PRB may not be on the frequency domain resource of the control channel PRB corresponding thereto. For example, as shown in FIG. 5B, the referenced data channel PRB corresponding to the unused PRB (PRB1) in the control channel region is PRB1, wherein the data channel PRB1 is not on the frequency domain resource corresponding to the control channel PRB1.

When the referenced data channel PRB is defined as being on the frequency domain resource of the control channel PRB corresponding thereto, the base station and the terminal may determine the referenced data channel PRB corresponding to the control channel PRB in a pre-appointed manner. For example, the first PRB of one or more of PRBs on the same frequency domain resources corresponding to each control channel PRB (the first PRB of the frequency domain from low to high, or the first PRB of the frequency domain from high to low, or the PRB having the smallest PRB index, or the PRB having the largest PRB index) is the referenced data channel PRB of the control channel PRB.

When the referenced data channel PRB is defined as being on the frequency domain resource of the control channel PRB corresponding thereto, the base station indicates to the terminal, by signaling, the control channel PRB or the referenced data channel PRB corresponding to the unused PRB in the control channel region. For example, as shown in FIG. 5A, the base station may indicate to the terminal that the referenced data channel PRB of the control channel region PRB is the first data channel PRB (such as PRB2) or the second data channel PRB (such as PRB3) on the same frequency domain resource corresponding to the control channel region PRB by 1-bit signaling. Preferably, the base station separately assigns a referenced data channel PRB to the unused PRBs in each control region by signaling. For example, if there are two unused PRBs in the control region, the base station uses 2-bit signaling for the referenced data channel PRB positions of the two PRBs, respectively. An optional way is that the base station specifies a referenced data channel PRB position (frequency domain) for each PRB position in the frequency domain in the control channel region.

It should be noted that the control channel PRB or the data channel PRB in this embodiment only refers to the frequency domain. When the control channel includes multiple symbols, the control channel PRB includes multiple symbols. When the control channel includes 1 symbol, the control channel PRB includes only 1 symbol. Similarly, the corresponding data channel PRB is in the same way.

Third Specific Embodiment

In this embodiment, the second-level DCI is transmitted in the data area by using a data channel, and the same data channel is taken as an example for description.

Figure 6A:
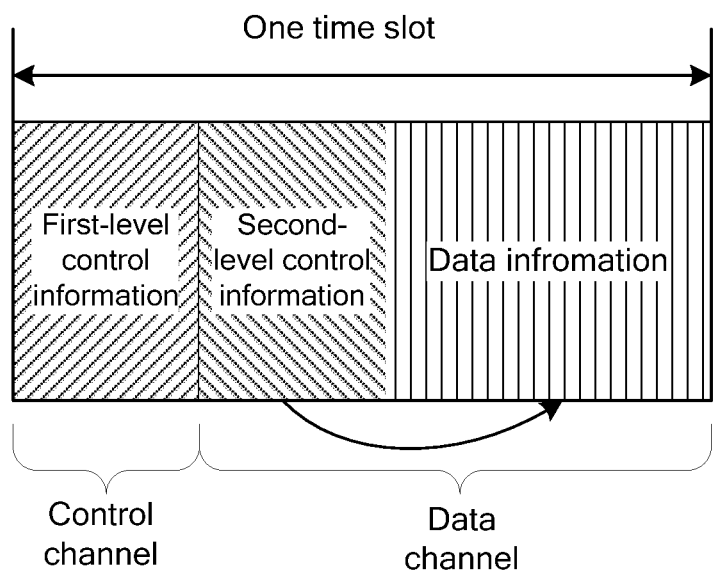
FIG. 6A is a first schematic diagram of an indication relationship in which control information and data information are multiplexed in the same data channel according to an embodiment of the present disclosure.
Figure 6B:
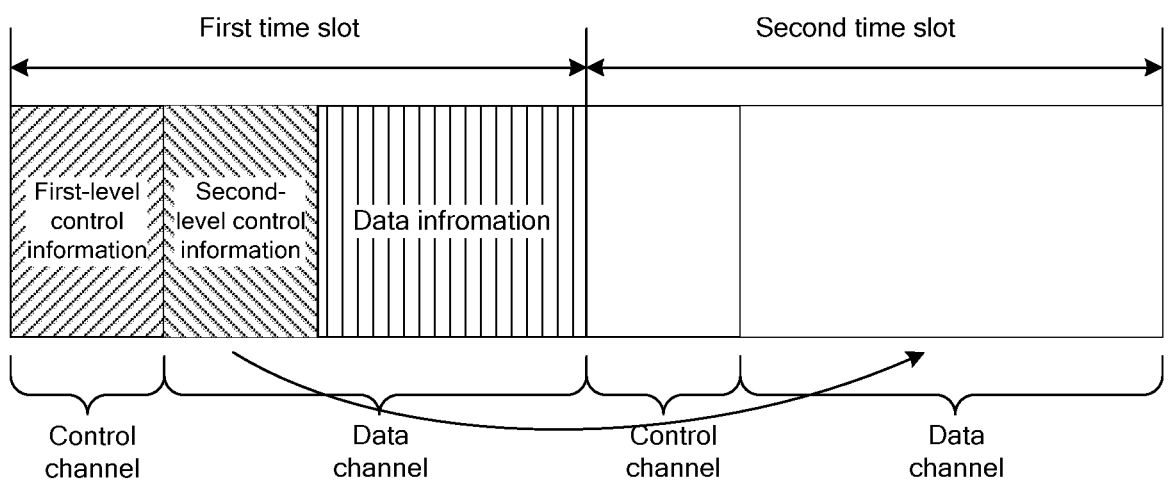
FIG. 6B is a second schematic diagram of an indication relationship in which the control information and the data information are multiplexed in the same data channel according to an embodiment of the present disclosure.
Figure 6C:
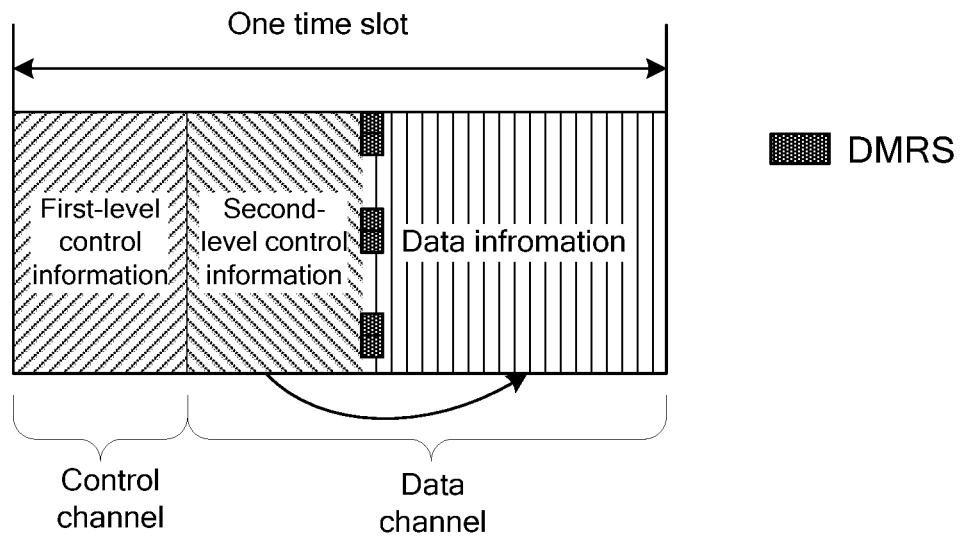
FIG. 6C is a third schematic diagram of an indication relationship in which the control information and the data information are multiplexed in the same data channel according to an embodiment of the present disclosure.

The terminal has two levels of control information, the first level control information is transmitted in the control channel, and the second level control information and the data information are transmitted in the same data channel. Herein, the first level control information is mainly used to indicate the resource location of the data channel, and the multiplexing mode indication information of the second level control information and the data information in the data channel; or the first level control information is mainly used to indicate slow-varying parameter information (for example, time-frequency resource location, modulation mode, etc.) related to the data channel transmission, and the second level control information is mainly used to indicate fast-varying parameter information (such as HARQ, MCS level, and the like) related to data channel transmission; or the first level control information is mainly used to indicate delay-sensitive parameter information related to data channel transmission, and the second level control information is mainly used to indicate less-delay-sensitive parameter information related to data channel transmission. Preferably, on the time-frequency resource occupied by the data channel, the control information transmitted in the data channel is located before the data information. The control information multiplexed in the same data channel may be used to indicate a transmission related configuration of data information in the current data channel, or may also be used to indicate a transmission related configuration of the data channel in the next scheduling unit (e.g., a time slot). As shown in FIG. 6A, the control information (second level control information) multiplexed with the data information in the same data channel is mainly used to indicate parameter indication information related to data information transmission in the data channel; as shown in FIG. 6B, the control information (second level control information) multiplexed with the data in the same data channel is mainly used to indicate parameter indication information related to data channel transmission in the next time slot. The base station indicates to the terminal an end position of the control information in the data channel or a start position of the data information (one kind of the multiplexing mode indication information), and the terminal receives the data channel through the indication information and distinguishes the control information and the data information. As shown in FIG. 6C, the data information carried in the data channel is mapped after the start position of the Demodulation Reference Signal (DMRS), and the control information carried in the data channel is mapped before the DMRS start position. Alternatively, the base station may also configure a set of DMRS resources for the two data channels, wherein the set of DMRS resources includes a basic reference signal resource and an extended demodulation reference signal resource, wherein the basic demodulation reference signal resource is located at the start position of the time domain of the data channel carrying the control information, and the extended demodulation reference signal resource is located at the start position of the time domain of the data channel carrying the data information. The basic demodulation reference signal resource mainly receives a data channel for carrying control information, and the basic demodulation reference signal resource and the extended demodulation reference signal resource can be used to receive the data channel carrying the data information.

As a further implementation in the embodiment of the present disclosure, the second level control information may be carried on designated one of the transmission blocks (TBs) in the data channel for transmission. The designated TB may be pre-appointed by the base station and the terminal, for example, the first TB, or the base station indicates to the terminal which TB of the data channel is used to transmit control information. The terminal obtains the indication information of the TB for transmitting the control information according to a pre-appointed manner or by receiving the indication information from the base station, and then receives the control information on the corresponding TB and receives the data information on other TBs.

As still another implementation in the embodiment of the present disclosure, the second level control information may be carried on designated one (e.g., the first transport layer) of transport layers in the data channel for transmission. The designated transport layer may be pre-appointed by the base station and the terminal, for example, the first transport layer, or the base station indicates to the terminal which transport layer of the data channel is used to transmit the control information. The terminal obtains the indication information of the transport layer for transmitting the control information according to a pre-appointed manner or by receiving the indication information from the base station, and then receives the control information on the corresponding transport layer and the data information on other transport layers.

As a further implementation of the embodiment of the present disclosure, the second level control information and the data information are transmitted in two separate data channels, respectively. The two data channels can adopt independent transmission schemes, MCS, etc., but occupy the same time-frequency resources by default. In other words, the second level control information and the data information are multiplexed in a manner similar to MU (Multi-User). The two data channels have the same transmission scheme, the Modulation and coding scheme, and the transmit/receive beams, or there is a predefined correspondence. The base station configures two sets of DMRS ports for the two data channels, wherein the first set of DMRS ports are used to receive the data channel carrying the second level control information, and the second set of DMRS ports are used to receive the data channel carrying the data information.

Through the description of the above embodiments, those skilled in the art can clearly understand that the method according to the embodiments can be implemented by means of software plus a necessary general hardware platform, and of course, can also be through hardware, but in many cases, the former is a better implementation. Based on such understanding, the technical solution of the present disclosure, which is essential or contributes to the prior art, may be embodied in the form of a software product stored in a storage medium (such as ROM/RAM, disk, or optical disc), including a number of instructions for causing a terminal device (which may be a mobile phone, a computer, a server, or a network device, etc.) to perform the methods described in various embodiments of the present disclosure.

In the embodiment, there are provided a device for transmitting control information and a device for receiving control information, which are used to implement the embodiments and preferred implementation and detailed description of which will be omitted herein. The term "module" as used below may implement a combination of software and/or hardware of a predetermined function. Although the device described in the following embodiments is preferably implemented in software, hardware or a combination of software and hardware is also possible and contemplated.

Figure 7:
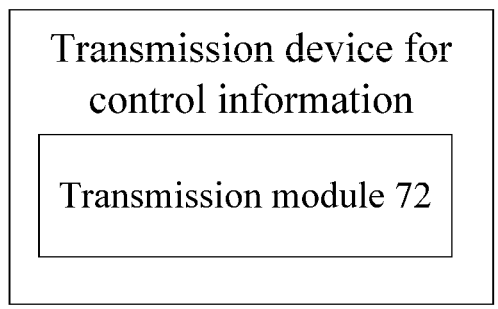
FIG. 7 is a structural block diagram of a transmission device for control information according to an embodiment of the present disclosure.

FIG. 7 is a structural block diagram of a transmission device for control information according to an embodiment of the present disclosure. As shown in FIG. 7, the device includes a transmission module 72, which will be described later.

The transmission module 72 is configured to transmit control information according to a specified transmission mode, wherein the specified transmission mode has a predetermined relationship with a data channel.

In an optional embodiment, the specified transmission mode includes: carrying the control information in the control channel for transmission.

In an optional embodiment, the method further includes: assigning a plurality of parameter configurations (numerology) for the control channel. In this embodiment, the step of assigning a plurality of configuration parameters for the control channel may be performed before the control information is transmitted in accordance with the specified transmission mode. It should be noted that, in practice, a parameter configuration may also be assigned for the control channel according to a desirable condition. Optionally, the parameter configurations may be pre-appointed by the base station and the terminal, or indicated by the base station to the terminal. For example, the base station may indicate to the terminal by signaling.

In an optional embodiment, the predetermined relationship between the specified transmission mode and the data channel may include: a correspondence relationship between a parameter configuration of the control channel and a parameter configuration of the data channel.

In an optional embodiment, the parameter configuration of the control channel includes at least one of: a Cyclic Prefix length of Orthogonal Frequency Division Multiplexing OFDM symbol; a length of Orthogonal Frequency Division Multiplexing OFDM symbol; the number of orthogonal frequency division multiplexed OFDM symbols; frequency domain Subcarrier Spacing; the number of frequency domain subcarrier; a proportion of Cyclic Prefix in Orthogonal Frequency Division Multiplexing OFDM symbol.

In an optional embodiment, the parameter configuration of the data channel may include at least one of: a Cyclic Prefix length of Orthogonal Frequency Division Multiplexing OFDM symbols, a length of Orthogonal Frequency Division Multiplexing OFDM symbol, the number of Orthogonal Frequency Division Multiplexing OFDM symbol, frequency domain Subcarrier Spacing; the number of frequency domain subcarrier; a proportion of the Cyclic Prefix in Orthogonal Frequency Division Multiplexing OFDM symbol.

In an optional embodiment, the correspondence relationship includes the Cyclic Prefix length of the OFDM symbol of the control channel and the number or length of the OFDM symbols of the control channel have a predefined correspondence relationship with a Cyclic Prefix length of an OFDM symbol of the data channel.

In an optional embodiment, the predefined correspondence relationship includes at least one of: the Cyclic Prefix length of the OFDM symbol of the control channel is equal to one Qth of the Cyclic Prefix length of the OFDM symbol of the data channel; the Cyclic Prefix length of the OFDM symbol of the control channel is equal to P times the Cyclic Prefix length of the OFDM symbol of the data channel; the length of OFDM symbol of the control channel is equal one Qth of the length of the OFDM symbol of the data channel; the length of the OFDM symbol of the control channel is equal to P times the length of the OFDM symbol of the data channel; the Cyclic Prefix length of the OFDM symbol of the control channel has a predefined correspondence relationship with the number of OFDM symbol of the control channel; the length of the OFDM symbol of the control channel has a predefined correspondence relationship with the number of the OFDM symbols of the control channel, wherein Q is a positive integer and a value of Q is equal to a ratio of a frequency domain Subcarrier Spacing of the control channel to a frequency domain subcarrier of the data channel, P is greater than one Qth and less than or equal to one.

In an optional embodiment, the device further includes: a first processing module, configured to assign parameter configurations for the control channel by at least one of: assigning the parameter configurations for the control channel according to a ratio relationship between a frequency domain Subcarrier Spacing (SCS) of the control channel and a frequency domain Subcarrier Spacing (SCS) of the data channel; and assigning the parameter configurations for the control channel according to a frequency domain resource location of the control channel.

In an optional embodiment, the specified transmission mode may also include: carrying control information in a control channel region for transmission.

In an optional embodiment, the method further includes: assigning a referenced physical resource block for the physical resource block of the control channel region. Optionally, the referenced physical resource block may be pre-appointed by the base station and the terminal or indicated by the base station to the terminal. For example, the base station may indicate to the terminal by signaling.

In an optional embodiment, the predetermined relationship between the specified transmission mode and the data channel may include: the referenced physical resource block being located in the data channel region where the data channel is located.

In an optional embodiment, the referenced physical resource block is one or more of physical resource blocks in the data channel region on a frequency domain location corresponding to the physical resource block of the control channel region.

In an optional embodiment, the data channel corresponding to the referenced physical resource block is allowed to be transmitted on the physical resource block of the control channel.

In an optional embodiment, the first processing module is further configured to determine the referenced physical resource block by at least one of: by a predefined manner; a control channel notification; a Medium Access Control (MAC) signaling notification; and Radio Resource Control (RRC) signaling notification.

In an optional embodiment, the specified transmission mode may further include: carrying the control information in the data channel for transmission.

In an optional embodiment, the predetermined relationship between the specified transmission mode and the data channel may include: carrying the control information in the data channel for transmission.

In an optional embodiment, the control information is carried on specified one or more of Transmission Blocks (TBs) in the data channel for transmission; or the control information is carried on specified one or more of transmission layers in the data channel for transmission.

In an optional embodiment, the first processing module is further configured to assign a limited Modulation and coding scheme (MCS) value range for the data channel.

In an optional embodiment, a referenced data channel may be assigned for the data channel carrying the control information, wherein the referenced data channel carries data information, and the data channel carrying the control information and the referenced data channel share a set of transmission parameters. Optionally, the referenced data channel may be pre-appointed by the base station and the terminal, or indicated by the base station to the terminal. For example, the base station may indicate to the terminal by signaling.

In an optional embodiment, the transmission parameter includes at least one of: a time-frequency resource occupied by the data channel transmission; a transmission scheme adopted by the data channel transmission; a Modulation and coding scheme MCS adopted by the data channel transmission; a beam adopted by the data channel transmission; and a demodulation reference signal resource associated with the data channel.

In an optional embodiment, the demodulation reference signal resource includes two sets of demodulation reference signal resources, wherein the two sets of demodulation reference signal resources are used to transmit the data channel carrying control information and referenced data channel, respectively.

In an optional embodiment, information carrying in the data channel includes the data information.

In an optional embodiment, the demodulation reference signal may be assigned after the time domain and/or the frequency domain location of the control information carried in the data channel, and the data information may be assigned after a start position of a time domain and/or frequency domain location of the demodulation reference signal.

In an optional embodiment, the first processing module is further configured to: assign a basic demodulation reference signal resource and an extended demodulation reference signal resource to the data channel, wherein the basic demodulation reference signal resource is located at the start position of the time domain and/or frequency domain of the control information transmission in the data channel, and the extended demodulation reference signal resource is located at the start position of the time domain and/or frequency domain of the data information transmission in the data channel.

In an optional embodiment, the first processing module is further configured to perform at least one of assigning two sets of encoding rates for the data channel, wherein the two sets of encoding rates are configured to transmit the control information and data information, respectively; and assigning two sets of power parameters for the data channel, wherein the two sets of power parameters are configured to transmit the control information and data information, respectively.

In an optional embodiment, the data channel is located in a scheduling time unit for control information transmission, wherein the scheduling time unit includes one or more time units, and each time unit includes one of: a time slot, minislot, an Orthogonal Frequency Division Multiplexing OFDM symbol, a sub-frame and a frame.

In an optional embodiment, there is also provided a base station including any one of transmission devices for control information as set forth above.

Figure 8:
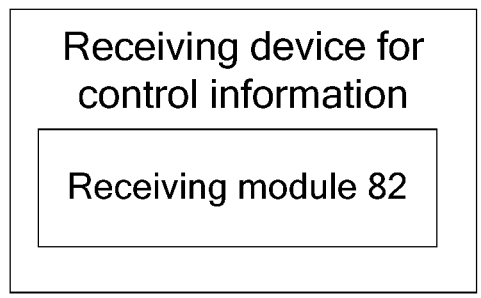
FIG. 8 is a structural block diagram of a receiving device for control information according to an embodiment of the present disclosure.

FIG. 8 is a structural block diagram of a receiving device for control information according to an embodiment of the present disclosure. As shown in FIG. 8, the device includes a receiving module 82, which will be described later.

The receiving module 82 is configured to receive control information according to a specified transmission mode, wherein the specified transmission mode has a predetermined relationship with a data channel.

In an optional embodiment, there may be a plurality of specified transmission modes, one of which may include: receiving the control information by receiving a control channel.

In an optional embodiment, the method further includes: determining a plurality of parameter configurations of the control channel. In this embodiment, a receiving end (for example, the terminal) may determine the parameter configurations of the control channel in an appointed manner in advance with a transmitting end (for example, the base station), or may determine the parameter configurations of the control channel by receiving an indication from the base station.

In an optional embodiment, the predetermined relationship between the specified transmission mode and the data channel includes: a correspondence relationship between a parameter configuration of the control channel and a parameter configuration of the data channel. In this embodiment, the base station may configure one or more configuration parameters for the control channel.

In an optional embodiment, the parameter configuration of the control channel and the parameter configuration of the data channel all include at least one of: a Cyclic Prefix length of Orthogonal Frequency Division Multiplexing OFDM symbol; a length of Orthogonal Frequency Division Multiplexing OFDM symbol; the number of Orthogonal Frequency Division Multiplexing OFDM symbol; frequency domain Subcarrier Spacing; the number of frequency domain subcarrier; and a proportion of Cyclic Prefix in Orthogonal Frequency Division Multiplexing OFDM symbol.

In an optional embodiment, the device further includes: a second processing module configured to: determine, according to a relationship between a Cyclic Prefix of OFDM symbol of the data channel and a Cyclic Prefix of OFDM symbol of the control channel, the number or length of OFDM symbols of the control channel; or determine, according to a relationship between a length of OFDM symbol of the data channel and a length of OFDM symbol of the control channel, the number or length of OFDM symbol of the control channel, wherein the Cyclic Prefix of the OFDM symbol and the number or length of the OFDM symbol of the control channel have a predefined correspondence relationship with the Cyclic Prefix of the OFDM symbol of the data channel.

In an optional embodiment, the predefined correspondence relationship includes at least one of: the Cyclic Prefix length of the OFDM symbol of the control channel is equal to one Qth of the Cyclic Prefix length of the OFDM symbol of the data channel; the Cyclic Prefix length of the OFDM symbol of the control channel is equal to P times the Cyclic Prefix length of the OFDM symbol of the data channel; the length of OFDM symbol of the control channel is equal one Qth of the length of the OFDM symbol of the data channel; the length of the OFDM symbol of the control channel is equal to P times the length of the OFDM symbol of the data channel; the Cyclic Prefix length of the OFDM symbol of the control channel has a predefined correspondence relationship with the number of OFDM symbol of the control channel; the length of the OFDM symbol of the control channel has a predefined correspondence relationship with the number of the OFDM symbols of the control channel, wherein Q is a positive integer and a value of Q is equal to a ratio of a frequency domain Subcarrier Spacing of the control channel to a frequency domain subcarrier of the data channel, P is greater than one Qth and less than or equal to one. Optionally, Q is an integer greater than one.

In an optional embodiment, the second processing module is further configured to determine the parameter configurations of the control channel by at least one of: determining the parameter configurations of the control channel according to a ratio relationship between a frequency domain Subcarrier Spacing (SCS) of the control channel and a frequency domain Subcarrier Spacing (SCS) of the data channel; and determining the parameter configurations of the control channel according to the frequency domain resource location of the control channel.

In an optional embodiment, the specified transmission mode may include: receiving the control information in a control channel region. In this embodiment, the control channel region generally refers to a time domain resource region specified in a scheduling time unit that can be used to transmit the control channel.

In an optional embodiment, the method may further include: determining a referenced physical resource block corresponding to a physical resource block of the control channel region.

In an optional embodiment, the predetermined relationship between the specified transmission mode and the data channel may include: the determined referenced physical resource block corresponding to the physical resource block of the control channel region being located in the data channel region where the data channel is located.

In an optional embodiment, the determined referenced physical resource block is one or more of physical resource blocks in a data channel region at a frequency domain location corresponding to a physical resource block of the control channel region.

In an optional embodiment, if it is determined that the physical resource block of the control channel region is an unused physical resource block, the physical resource block of the control channel region is occupied by the data channel corresponding to the referenced physical resource block by default.

In an optional embodiment, the second processing module is further configured to determine a referenced physical resource block by at least one of: a predefined manner; receiving the control channel; receiving a Medium Access Control (MAC) signaling; and receiving Radio Resource Control (RRC) signaling.

In an optional embodiment, the specified transmission mode includes: acquiring the control information by receiving the data channel.

In an optional embodiment, the predetermined relationship between the specified transmission mode and the data channel may include: carrying the control information in the data channel for transmission In an optional embodiment, the receiving module 82 is further configured to acquire the control information by receiving specified one or more of Transmission Blocks (TBs) in the data channel or by receiving specified one or more of transmission layers in the data channel.

In an optional embodiment, the receiving module 82 is further configured to receive the data channel according to a limited Modulation and coding scheme (MCS) value range. In this embodiment, the limited MCS value range may be pre-appointed by the base station and the terminal, or indicated by the base station to the terminal. Herein, when the base station indicates it to the terminal, the indication method includes: indicating, by high layer signaling or MAC signaling, the limited MCS value range to the terminal. Optionally, different UEs may correspond to different limited MCS value ranges.

In an optional embodiment, the second processing module is further configured to determine the referenced data channel of the data channel carrying the control information, and determine the transmission parameters of the data channel carrying the control information according to the referenced data channel.

In an optional embodiment, the transmission parameter includes at least one of: a time-frequency resource occupied by the data channel transmission; a transmission scheme adopted by the data channel transmission; a Modulation and coding scheme MCS adopted by the data channel transmission; a beam adopted by the data channel transmission; and a demodulation reference signal resource associated with the data channel.

In an optional embodiment, the demodulation reference signal resource includes two sets of demodulation reference signal resources, wherein the two sets of demodulation reference signal resources are used to demodulate the data channel carrying control information and referenced data channel, respectively.

In an optional embodiment, the receiving module 82 is further configured to receive data information through the data channel.

In an optional embodiment, the second processing module is further configured to determine a demodulation reference signal, and determine the control information before a start position of a time domain and/or the frequency domain location of the demodulation reference signal and the data information after the start position of the time domain and/or the frequency domain location of the demodulation reference signal.

In an optional embodiment, the second processing module is further configured to determine the demodulation reference signal resource of the data channel including a basic demodulation reference signal resource and an extended demodulation reference signal resource, wherein the control information carried in the data channel is demodulated according to the basic demodulation reference signal resource, the data information carried in the data channel is demodulated according to the extended demodulation reference signal resource, the basic demodulation reference signal resource is located at the start position of the time domain and/or frequency domain of the control information transmission in the data channel, and the extended demodulation reference signal resource is located at the start position of the time domain and/or frequency domain of the data information transmission in the data channel.

In an optional embodiment, the second processing module is further configured to perform at least one of: determining two sets of encoding rates assigned for the data channel, wherein the two sets of encoding rates are configured to transmit the control information and data information, respectively; and determining two sets of power parameters assigned for the data channel, wherein the two sets of power parameters are configured to transmit the control information and data information, respectively.

In an optional embodiment, the data channel is located in a scheduling time unit for control information transmission, wherein the scheduling time unit includes one or more time units, and each time unit includes one of: a time slot, minislot, an Orthogonal Frequency Division Multiplexing OFDM symbol, a sub-frame and a frame.

According to another embodiment of the disclosure, there is provided a terminal including any one of the devices for receiving control information as set forth above.

It should be noted that each of the above modules may be implemented by software or hardware. For the hardware, it may be implemented by, but not limited to, the modules all located in the same processor, or the modules located in different processors in any combination.

There is also provided a storage medium in an embodiment of the present disclosure. Optionally, in this embodiment, the storage medium may be configured to store program codes for performing one or a combination of the steps in the method embodiments as set forth above.

In this embodiment, the storage medium may include, but is not limited to, a USB flash drive, a Read-Only Memory (ROM), a Random Access Memory (RAM), a mobile hard disk device, a magnet disk, or an optical disk, which can store program codes.

In this embodiment, the processor performs one or a combination of the steps in the method embodiments according to the stored program codes in the storage medium.

For specific examples in this embodiment, reference may be made to the examples described in the embodiments and the optional implementations as set forth above, details of which will not be described herein.

In the embodiments of the present disclosure, the control information is carried in the control channel or data channel for transmission by using a specified transmission mode, wherein the specified transmission mode is related to the data channel. By configuring various CP lengths of control channel related to the CP length of the data channel, it is advantageous to increase the number of symbols for control channel transmission, and at the same time ensure that the CP length meets the system requirements when the control channel/data channel is multiplexed; by assigning the physical resource block of the referenced data channel for the physical resource block, it is possible to avoid the ambiguity problem of the data channel using the control channel physical resource block in the control channel region for transmission, thereby improving system performance; and by transmitting the control information on the specified TB block or transmission layer in the data channel, it is advantageous for reducing control information transmission overhead (control information and data information sharing a set of codec resources, transmission resources, etc.); and by distinguishing control information and data information in the data channel by demodulation reference signal resources, the terminal can quickly identify the control information and the data information in the data channel, thereby advantageously reducing the processing delay of the control information and the data information.

Therefore, the method comprehensively considers complexity and signaling overhead, and implements a flexible and effective transmission multiplexing mode of the control channel and the data channel.

Obviously, those skilled in the art should understand that the above modules or steps of the present disclosure can be implemented by a general computing device, which can be integrated on a single computing device or distributed among multiple computing devices. Optionally, they may be implemented by program code executable by the computing device such that they may be stored in the storage device by the computing device. In some cases, the steps shown or described may be performed in a different sequence as stated herein, or they may be separately fabricated into individual integrated circuit modules, or a plurality of modules or steps thereof are fabricated into a single integrated circuit module. Thus, the disclosure is not limited to any particular combination of hardware and software.

The above description is only the preferred embodiments of the present disclosure, and is not intended to limit the present disclosure. For those skilled in related art, various changes and modifications may be made to the present disclosure. Any modifications, equivalent substitutions and improvements. made within the spirit and principles of this disclosure are intended to fall within the scope of the present disclosure.

INDUSTRIAL APPLICABILITY

According to the disclosure, since the control information is transmitted according to the specified transmission mode and there is the predetermined relationship between the specified transmission mode and the data channel, the complexity of the communication channel design and the complexity of the user reception can be effectively reduced, At the same time, the signaling overhead can be reduced. The flexible and effective transmission multiplexing mode of the control information and data information can be realized, thereby effectively solving the problems of the high complexity of communication channel design and the user reception and the heavy signaling overhead in the related art.

The invention claimed is:

1. A method for transmitting control information, comprising:
transmitting control information according to a specified transmission mode, wherein the specified transmission mode has a predetermined relationship with a data channel; and
wherein a referenced data channel is assigned for the data channel carrying the control information, the referenced data channel carries data information, and the data channel carrying the control information and the referenced data channel share a set of transmission parameters, and the referenced data channel is indicated by the base station to the terminal or pre-appointed by the base station and the terminal.

2. The method according to claim 1 wherein the specified transmission mode comprises: carrying the control information in the control channel for transmission, and
the method further comprises: assigning a plurality of parameter configurations for the control channel.

3. The method according to claim 2 wherein the predetermined relationship between the specified transmission mode and the data channel comprises: a correspondence relationship between a parameter configuration of the control channel and a parameter configuration of the data channel.

4. The method according to claim 3, wherein the parameter configuration of the control channel comprises at least one of:
a Cyclic Prefix length of the Orthogonal Frequency Division Multiplexing OFDM symbol;
a length of the Orthogonal Frequency Division Multiplexing OFDM symbol;
the number of Orthogonal Frequency Division Multiplexing OFDM symbol;
a frequency domain Subcarrier Spacing;
the number of frequency domain subcarrier; and
a proportion of the Cyclic Prefix in the Orthogonal Frequency Division Multiplexing OFDM symbol,
the parameter configuration of the data channel comprises at least one of:
a Cyclic Prefix length of Orthogonal Frequency Division Multiplexing OFDM symbol;
a length of Orthogonal Frequency Division Multiplexing OFDM symbol;
the number of Orthogonal Frequency Division Multiplexing OFDM symbol;
frequency domain Subcarrier Spacing;
the number of frequency domain subcarrier; and
a proportion of the Cyclic Prefix in Orthogonal Frequency Division Multiplexing OFDM symbol.

5. The method according to claim 3, wherein the correspondence relationship comprises: the Cyclic Prefix length of Orthogonal Frequency Division Multiplexing OFDM symbol and the number or length of the OFDM symbol of the control channel having a first predefined correspondence relationship with the Cyclic Prefix length of the OFDM symbol of the data channel, and
the first predefined correspondence relationship comprises at least one of:
the Cyclic Prefix length of the OFDM symbol of the control channel being equal to one Qth of the Cyclic Prefix length of the OFDM symbol of the data channel;
the Cyclic Prefix length of the OFDM symbol of the control channel being equal to P times the Cyclic Prefix length of the OFDM symbol of the data channel;
the length of OFDM symbol of the control channel being equal one Qth of the length of the OFDM symbol of the data channel;
the length of the OFDM symbol of the control channel being equal to P times the length of the OFDM symbol of the data channel;
the Cyclic Prefix length of the OFDM symbol of the control channel having a second predefined correspondence relationship with the number of OFDM symbol of the control channel; and
the length of the OFDM symbol of the control channel having a third predefined correspondence relationship with the number of the OFDM symbols of the control channel, wherein
Q is a positive integer, and P is greater than one Qth and less than or equal to one.

6. The method according to claim 2, further comprising: assigning the parameter configurations for the control channel by at least one of:
assigning the parameter configurations for the control channel according to a ratio relationship between a frequency domain Subcarrier Spacing of the control channel and a frequency domain Subcarrier Spacing of the data channel; and
assigning the parameter configurations for the control channel according to a frequency domain resource location of the control channel.

7. The method according to claim 1, wherein the specified transmission mode comprises: transmitting the control information in a control channel region, and
the method further comprises: assigning a referenced physical resource block for a physical resource block of the control channel region which is unused,
wherein the referenced physical resource block is indicated by the base station to the terminal or pre-appointed by the base station and the terminal.

8. The method according to claim 7, wherein the predetermined relationship between the specified transmission mode and the data channel comprises: the referenced physical resource block being located in the data channel region where the data channel is located, the referenced physical resource block is one or more of physical resource blocks of the data channel region at a frequency domain location corresponding to a physical resource block of the control channel region, the data channel corresponding to the referenced physical resource block is allowed to be transmitted on a physical resource block of the control channel region, and the method further comprises: determining the referenced physical resource block by at least one of: a predefined manner; a control channel notification; a Medium Access Control MAC signaling notification; and a Radio Resource Control (RRC) signaling notification.

9. The method according to claim 1 wherein the specified transmission mode comprises: carrying the control information in the data channel for transmission, the control information is carried on specified one or more of Transmission Blocks of the data channel for transmission or the control information is carried on specified one or more of transmission layers of the data channel for transmission, the transmission parameter comprises at least one of: a time-frequency resource occupied by the data channel transmission; a transmission scheme adopted by the data channel transmission; a Modulation and coding scheme MCS adopted by the data channel transmission; a beam adopted by the data channel transmission; and a demodulation reference signal resource associated with the data channel, the demodulation reference signal resource includes two sets of demodulation reference signal resources, wherein the two sets of demodulation reference signal resources are configured to transmit the data channel carrying control information and the referenced data channel, respectively.

10. The method according to claim 9, wherein the information carried in the data channel further includes data information, the method further comprises: assigning the demodulation reference signal after the time domain and/or the frequency domain location of the control information carried in the data channel, and assigning the data information after a start position of a time domain and/or frequency domain location of the demodulation reference signal, the method further comprises: assigning a basic demodulation reference signal resource and an extended demodulation reference signal resource for the data channel, wherein the basic demodulation reference signal resource is located at the start position of the time domain and/or frequency domain of the control information transmission in the data channel, and the extended demodulation reference signal resource is located at the start position of the time domain and/or frequency domain of the data information transmission in the data channel, the method further comprises at least one of: assigning two sets of encoding rates for the data channel, wherein the two sets of encoding rates are configured to transmit the control information and data information, respectively; and assigning two sets of power parameters for the data channel, wherein the two sets of power parameters are configured to transmit the control information and data information, respectively.

11. The method according to claim 1 wherein the data channel is located in a scheduling time unit for control information transmission, wherein the scheduling time unit includes one or more time units, and each time unit includes one of: a time slot, minislot, an Orthogonal Frequency Division Multiplexing OFDM symbol, a sub-frame and a frame.

12. A method for receiving control information, comprising:

receiving control information according to a specified transmission mode, wherein the specified transmission mode has a predetermined relationship with a data channel;

wherein a referenced data channel is assigned for the data channel carrying the control information, the referenced data channel carries data information, and the data channel carrying the control information and the referenced data channel share a set of transmission parameters, and the referenced data channel is indicated by the base station to the terminal or pre-appointed by the base station and the terminal.

13. The method according to claim 12, wherein the specified transmission mode comprises: receiving the control information by receiving a control channel, and the method further comprises: determining a plurality of parameter configurations of the control channel.

14. The method according to claim 13, wherein the predetermined relationship between the specified transmission mode and the data channel comprises: a correspondence relationship between a parameter configuration of the control channel and a parameter configuration of the data channel, and each of the parameter configuration of the control channel and the parameter configuration of the data channel comprises at least one of:

a Cyclic Prefix length of Orthogonal Frequency Division Multiplexing OFDM symbol;

a length of Orthogonal Frequency Division Multiplexing OFDM symbol;

the number of Orthogonal Frequency Division Multiplexing OFDM symbol;

frequency domain Subcarrier Spacing;

the number of frequency domain subcarrier; and a proportion of Cyclic Prefix in Orthogonal Frequency Division Multiplexing OFDM symbol.

15. The method according to claim 14, further comprising:

determining, according to a relationship between a Cyclic Prefix of OFDM symbol of the data channel and a Cyclic Prefix of OFDM symbol of the control channel, the number or length of OFDM symbol of the control channel; or determining, according to a relationship between a length of OFDM symbol of the data channel and a length of OFDM symbol of the control channel, the number or length of OFDM symbol of the control channel, wherein the Cyclic Prefix of the OFDM symbol and the number or length of the OFDM symbol of the control channel have a first predefined correspondence relationship with the Cyclic Prefix of the OFDM symbol of the data channel, wherein the first predefined correspondence relationship comprises at least one of:

the Cyclic Prefix length of the OFDM symbol of the control channel being equal to one Qth of the Cyclic Prefix length of the OFDM symbol of the data channel;

the Cyclic Prefix length of the OFDM symbol of the control channel being equal to P times the Cyclic Prefix length of the OFDM symbol of the data channel;

the length of OFDM symbol of the control channel being equal one Qth of the length of the OFDM symbol of the data channel;

the length of the OFDM symbol of the control channel being equal to P times the length of the OFDM symbol of the data channel;

the Cyclic Prefix length of the OFDM symbol of the control channel having a second redefined correspondence relationship with the number of OFDM symbol of the control channel;

the length of the OFDM symbol of the control channel having a third predefined correspondence relationship with the number of the OFDM symbols of the control channel, wherein Q is a positive integer, P is greater than one Qth and less than or equal to one.

16. The method according to claim 14, further comprising: determining the parameter configurations of the control channel by at least one of:

determining the parameter configurations of the control channel according to a ratio relationship between a frequency domain Subcarrier Spacing of the control channel and a frequency domain Subcarrier Spacing of the data channel; and determining the parameter configurations of the control channel according to the frequency domain resource location of the control channel.

17. The method according to claim 12, wherein the specified transmission mode comprises: receiving the control information in a control channel region, the method further comprises: determining a referenced physical resource block corresponding to a physical resource block of the control channel region which is unused, wherein the referenced physical resource block is indicated by the base station to the terminal or pre-appointed by the base station and terminal;

the predetermined relationship between the specified transmission mode and the data channel comprises: the determined referenced physical resource block corresponding to the physical resource block of the control channel region being located in the data channel region where the data channel is located, the determined referenced physical resource block is one or more of physical resource blocks in a data channel region at a frequency domain location corresponding to a physical resource block of the control channel region, under the condition that it is determined that the physical resource block of the control channel region is an unused physical resource block, the physical resource block of the control channel region is occupied by the data channel corresponding to the referenced physical resource block by default, and the method further comprises: determining the referenced physical resource block by at least one of: a predefined manner; receiving the control channel; receiving a Medium Access Control MAC signaling; and receiving Radio Resource Control RRC signaling.

18. The method according to claim 12, wherein the specified transmission mode comprises: acquiring the control information by receiving the data channel, the control information is acquired by receiving specified one or more of Transmission Blocks in the data channel or by receiving specified one or more of transmission layers in the data channel, the data channel is received according to a limited Modulation and coding scheme MCS value range, the transmission parameters of the data channel carrying the control information are determined according to the referenced data channel, the transmission parameter comprises at least one of: a time-frequency resource occupied by the data channel transmission; a transmission scheme adopted by the data channel transmission; a Modulation and coding scheme MCS adopted by the data channel transmission; a beam adopted by the data channel transmission; and a demodulation reference signal resource associated with the data channel, and the demodulation reference signal resource includes two sets of demodulation reference signal resources, wherein the two sets of demodulation reference signal resources are configured to demodulate the data channel carrying control information and referenced data channel, respectively.

19. The method according to claim 18, further comprising: receiving the data information through the data channel;

determining a demodulation reference signal, and determining the control information before a start position of a time domain and/or the frequency domain location of the demodulation reference signal and the data information after the start position of the time domain and/or the frequency domain location of the demodulation reference signal;

determining the demodulation reference signal resource of the data channel including a basic demodulation reference signal resource and an extended demodulation reference signal resource, wherein the control information carried in the data channel is demodulated according to the basic demodulation reference signal resource, the data information carried in the data channel is demodulated according to the extended demodulation reference signal resource, the basic demodulation reference signal resource is located at the start position of the time domain and/or frequency domain of the control information transmission in the data channel, and the extended demodulation reference signal resource is located at the start position of the time domain and/or frequency domain of the data information transmission in the data channel;

determining two sets of encoding rates assigned for the data channel, wherein the two sets of encoding rates are configured to transmit the control information and data information, respectively; and determining two sets of power parameters assigned for the data channel, wherein the two sets of power parameters are configured to transmit the control information and data information, respectively.

20. The method according to claim 12, wherein the data channel is located in a scheduling time unit for control information transmission, wherein the scheduling time unit includes one or more time units, and each time unit includes one of: a time slot, minislot, an Orthogonal Frequency Division Multiplexing OFDM symbol, a sub-frame and a frame.

* * * * *